US012791831B2

(12) United States Patent
Lin et al.

(10) Patent No.: US 12,791,831 B2
(45) Date of Patent: Nov. 10, 2026

(54) PHOTOGRAPHY OPTICAL LENS ASSEMBLY, IMAGE CAPTURING UNIT AND ELECTRONIC DEVICE

(71) Applicant: LARGAN PRECISION CO., LTD., Taichung City (TW)

(72) Inventors: Guan-Bo Lin, Taichung (TW); Cheng-Yu Tsai, Taichung (TW)

(73) Assignee: LARGAN PRECISION CO., LTD., Taichung City (TW)

(*) Notice: Subject to any disclaimer, the term of this patent is extended or adjusted under 35 U.S.C. 154(b) by 215 days.

(21) Appl. No.: 18/749,078

(22) Filed: Jun. 20, 2024

(65) Prior Publication Data

US 2025/0291154 A1 Sep. 18, 2025

(30) Foreign Application Priority Data

Mar. 13, 2024 (TW) ................................ 113109194

(51) Int. Cl.
*G02B 9/60* (2006.01)

(52) U.S. Cl.
CPC .................................... *G02B 9/60* (2013.01)

(58) Field of Classification Search
CPC ....................................................... G02B 9/00
USPC ......................................................... 359/714
See application file for complete search history.

(56) References Cited

U.S. PATENT DOCUMENTS

| | | | | |
|---|---|---|---|---|
| 2013/0021680 A1* | 1/2013 | Chen | G02B 13/0045 359/714 |
| 2019/0187446 A1 | 6/2019 | Dai et al. | |
| 2022/0091372 A1 | 3/2022 | Jang et al. | |
| 2023/0087877 A1 | 3/2023 | Zhao et al. | |
| 2023/0400672 A1 | 12/2023 | Epple et al. | |
| 2025/0130407 A1 | 4/2025 | Wang et al. | |

FOREIGN PATENT DOCUMENTS

| | | |
|---|---|---|
| CN | 113740999 A | 12/2021 |
| CN | 113933975 A | 1/2022 |
| CN | 113960757 A | 1/2022 |
| CN | 114002814 A | 2/2022 |

(Continued)

OTHER PUBLICATIONS

TW Office Action dated Feb. 10, 2025 as received in Application No. 113109194.

(Continued)

*Primary Examiner* — Bumsuk Won
*Assistant Examiner* — Mitchell T Oestreich
(74) *Attorney, Agent, or Firm* — Maschoff Brennan

(57) ABSTRACT

A photography optical lens assembly includes five lens elements which are, in order from an object side to an image side along an optical path: a first lens element, a second lens element, a third lens element, a fourth lens element and a fifth lens element. Each of an object-side surface and an image-side surface of the first lens element has a central area and a peripheral area. The peripheral area of the object-side surface of the first lens element has a first refractive surface. The peripheral area of the image-side surface of the first lens element has a first reflective surface. The central area of the object-side surface of the first lens element has a second reflective surface. The central area of the image-side surface of the first lens element has a second refractive surface.

29 Claims, 26 Drawing Sheets

(56) References Cited

FOREIGN PATENT DOCUMENTS

| | | | |
|---|---|---|---|
| CN | 114072715 | A | 2/2022 |
| CN | 114114624 | A | 3/2022 |
| CN | 114442261 | A | 5/2022 |
| CN | 114488486 | A | 5/2022 |
| CN | 114755805 | A | 7/2022 |
| CN | 115494615 | A | 12/2022 |
| CN | 114755805 | B | 12/2023 |
| CN | 118169834 | A | 6/2024 |
| CN | 114252980 | B | 8/2024 |
| WO | 2021/027859 | A1 | 2/2021 |
| WO | 2024040993 | A1 | 2/2024 |

OTHER PUBLICATIONS

UK Search and Examination Report dated Jul. 28, 2025 in application No. 2501156.0.

* cited by examiner

3

PHOTOGRAPHY OPTICAL LENS ASSEMBLY, IMAGE CAPTURING UNIT AND ELECTRONIC DEVICE

RELATED APPLICATIONS

This application claims priority to Taiwan Application 113109194, filed on Mar. 13, 2024, which is incorporated by reference herein in its entirety.

BACKGROUND

Technical Field

The present disclosure relates to a photography optical lens assembly, an image capturing unit and an electronic device, more particularly to a photography optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as a telephoto feature, high image quality, low sensitivity, a proper aperture size, miniaturization and a desirable field of view.

SUMMARY

According to one aspect of the present disclosure, a photography optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, each of the object-side surface and the image-side surface of the first lens element has a central area and a peripheral area. Preferably, the peripheral area of the object-side surface of the first lens element has a first refractive surface. Preferably, the peripheral area of the image-side surface of the first lens element has a first reflective surface. Preferably, the central area of the object-side surface of the first lens element has a second reflective surface. Preferably, the central area of the image-side surface of the first lens element has a second refractive surface.

When a distance in parallel with a central axis between an axial vertex on the second reflective surface and a minimum effective radius position on the first reflective surface is DM2M1i, an axial distance between the second reflective surface and the image-side surface of the second lens element is DM2R4, an axial distance between the second reflective surface and an image surface is DM2I, and a focal length of the photography optical lens assembly is f, the following conditions are preferably satisfied:

$$0.30 < DM2M1i/DM2R4 < 1.00;$$

and $$0.35 < DM2I/f < 0.80.$$

According to another aspect of the present disclosure, a photography optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Preferably, each of the object-side surface and the image-side surface of the first lens element has a central area and a peripheral area. Preferably, the peripheral area of the object-side surface of the first lens element has a first refractive surface. Preferably, the peripheral area of the image-side surface of the first lens element has a first reflective surface. Preferably, the central area of the object-side surface of the first lens element has a second reflective surface. Preferably, the central area of the image-side surface of the first lens element has a second refractive surface. Preferably, the second lens element has negative refractive power. Preferably, the image-side surface of the second lens element is concave in a paraxial region thereof.

When a curvature radius of the object-side surface of the second lens element is R3, a curvature radius of the image-side surface of the second lens element is R4, and a refractive index of the second lens element is N2, the following conditions are preferably satisfied:

$$0.10 < (R3+R4)/(R3-R4) < 5.00;$$

and $$1.520 < N2 < 1.750.$$

According to another aspect of the present disclosure, an image capturing unit includes one of the aforementioned photography optical lens assemblies and an image sensor, wherein the image sensor is disposed on the image surface of the photography optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

A photography optical lens assembly includes five lens elements. The five lens elements are, in order from an object side to an image side along an optical path, a first lens element, a second lens element, a third lens element, a fourth lens element and a fifth lens element. Each of the five lens elements has an object-side surface facing toward the object side and an image-side surface facing toward the image side.

Figure 26:
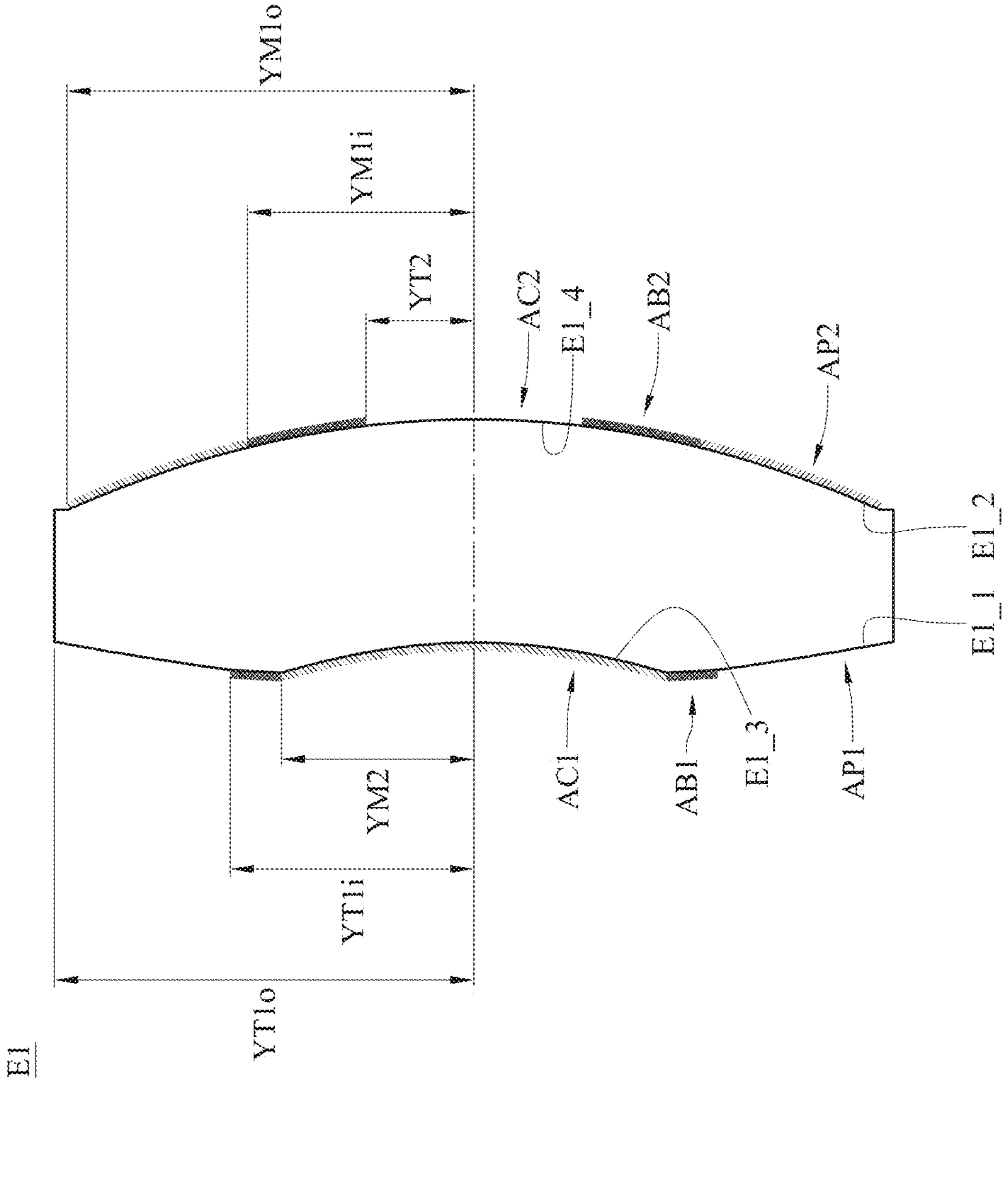
FIG. 26 shows a schematic view of light-blocking areas, central areas, peripheral areas, YT1o, YT1i, YM1o, YM1i, YM2 and YT2 according to the 1st embodiment of the present disclosure.

Each of the object-side surface and the image-side surface of the first lens element has a central area and a peripheral area. Therefore, it is favorable for improving the space utilization of the photography optical lens assembly by the area division design at different effective radii of the lens element. Please refer to FIG. 26, which shows a schematic view of the central area AC1 of the object-side surface of the first lens element, the central area AC2 of the image-side surface of the first lens element, the peripheral area AP1 of the object-side surface of the first lens element and the peripheral area AP2 of the image-side surface of the first lens element according to the 1st embodiment of the present disclosure.

The peripheral area of the object-side surface of the first lens element has a first refractive surface, the peripheral area of the image-side surface of the first lens element has a first reflective surface, the central area of the object-side surface of the first lens element has a second reflective surface, and the central area of the image-side surface of the first lens element has a second refractive surface. Therefore, it is favorable for reducing the component quantity and the cost without arranging additional reflective element, and it is also favorable for increasing the design flexibility at the reflective region and reducing assembly error by arranging the reflective surface on the lens element. Please refer to FIG. 26, which shows a schematic view of the first refractive surface E1_1, the first reflective surface E1_2, the second reflective surface E1_3 and the second refractive surface E1_4 according to the 1st embodiment of the present disclosure. Noted that the first reflective surface E1_2 faces towards the object side, and the second reflective surface E1_3 faces towards the image side.

Along the travelling sequence of the optical path, incident light can enter the first lens element via the first refractive surface, can be then reflected off the first reflective surface, can be subsequently reflected off the second reflective surface, and finally can exit the first lens element via the second refractive surface. Moreover, the second refractive surface can be convex in a paraxial region thereof. Therefore, it is favorable for effectively balancing and adjusting the travelling direction of reflected light and effectively adjusting the incident angle of light entering into the lens element at the image end thereof so as to prevent generating distortion. The paraxial region refers to a region near a central axis. Please refer to FIG. 25, which shows a schematic view of the central axis CA according to the 1st embodiment of the present disclosure.

The second lens element can have negative refractive power. Therefore, it is favorable for adjusting the refractive power of the second lens element so as to adjust the travelling direction of peripheral light, thereby maintaining relative illuminance at the periphery. Moreover, the image-side surface of the second lens element can be concave in a paraxial region thereof. Therefore, it is favorable for balancing the direction of the optical path and correcting spherical aberration of the photography optical lens assembly, thereby maintaining a proper back focal length thereof. Moreover, the second lens element can be located closer to the image side than the first reflective surface. Therefore, it is favorable for flattening each area of the image-side surface of the first lens element, thereby simplifying the manufacturing difficulty of the first lens element.

According to the present disclosure, the object-side surface of the first lens element can further have a light-blocking area located between the central area and the peripheral area thereof, and the image-side surface of the first lens element can further have a light-blocking area located between the central area and the peripheral area thereof. Therefore, it is favorable for preventing forming stray light when incident light is reflected several times, thereby reducing unwanted light-spot and thus improving image quality. Please refer to FIG. 26, which shows a schematic view of the light-blocking area AB1 of the object-side surface of the first lens element and the light-blocking area AB2 of the image-side surface of the first lens element according to the 1st embodiment of the present disclosure. Noted that the light-blocking area can include a matte film or an optical spraying layer. The matte film may be a membrane layer design composed of a metal-membrane layer and an oxide-membrane layer. The optical spraying layer may be a dark coating layer with a light-absorbing function, such as a black ink spraying layer formed by epoxy or quick-drying ink in which polyacrylate as a base is contained, a blackened coating layer through chemical vapor deposition, or a photoresistive coating layer. The optical spraying layer is easy to be applied on and adhered to a component surface and is suitable for mass production.

According to the present disclosure, each of the second lens element to the fifth lens element can be a plastic lens element. Therefore, it is favorable for increasing the plasticity of lens elements so as to easily manufacture lens elements and reduce manufacturing cost.

Figure 25:
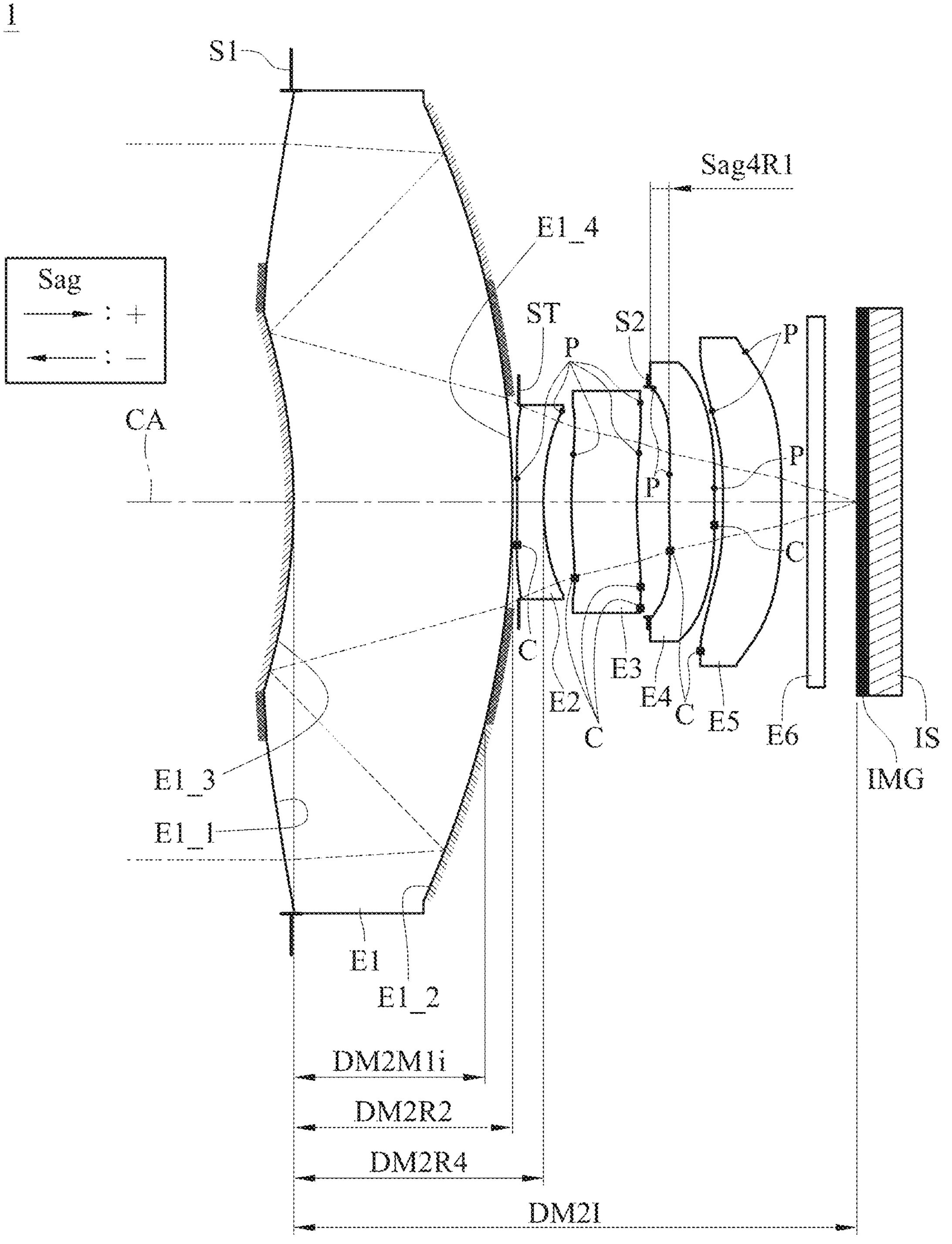
FIG. 25 shows a schematic view of inflection points on lens surfaces, critical points on lens surfaces, DM2M1i, DM2R2, DM2R4, DM2I and Sag4R1 according to the 1st embodiment of the present disclosure.

According to the present disclosure, at least one of the object-side surface and the image-side surface of at least one lens element among the second lens element to the fifth lens element can have at least one inflection point. Therefore, it is favorable for enhancing the flexibility in optical design so as to correct aberrations. Please refer to FIG. 25, which shows a schematic view of inflection points P on the object-side surface of the second lens element E2, the image-side surface of the second lens element E2, the object-side surface of the third lens element E3, the image-side surface of the third lens element E3, the object-side surface of the fourth lens element E4, the image-side surface of the fourth lens element E4, the object-side surface of the fifth lens element E5 and the image-side surface of the fifth lens element E5 according to the 1st embodiment of the present disclosure. The abovementioned inflection points P on the object-side surface of the second lens element E2, the image-side surface of the second lens element E2, the object-side surface of the third lens element E3, the image-side surface of the third lens element E3, the object-side surface of the fourth lens element E4, the image-side surface of the fourth lens element E4, the object-side surface of the fifth lens element E5 and the image-side surface of the fifth lens element E5 in FIG. 25 are exemplary. Each of lens surfaces in various embodiments of the present disclosure may also have one or more inflection points.

According to the present disclosure, at least one of the object-side surface and the image-side surface of at least one lens element among the second lens element to the fifth lens element can have at least one critical point in an off-axis region thereof. Therefore, it is favorable for further enhancing the flexibility in optical design, thereby correcting and compensating aberrations at the peripheral image. Please refer to FIG. 25, which shows a schematic view of critical points C on the object-side surface of the second lens element E2, the object-side surface of the third lens element E3, the image-side surface of the third lens element E3, the object-side surface of the fourth lens element E4, the image-side surface of the fourth lens element E4 and the object-side surface of the fifth lens element E5 according to the 1st embodiment of the present disclosure. The abovementioned critical points C on the object-side surface of the second lens element E2, the object-side surface of the third lens element E3, the image-side surface of the third lens element E3, the object-side surface of the fourth lens element E4, the image-side surface of the fourth lens element E4 and the object-side surface of the fifth lens element E5 in FIG. 25 are exemplary. Each of lens surfaces in various embodiments of the present disclosure may also have one or more critical points in an off-axis region thereof.

When a distance in parallel with the central axis between an axial vertex on the second reflective surface and a minimum effective radius position on the first reflective surface is DM2M1i, and an axial distance between the second reflective surface and the image-side surface of the second lens element is DM2R4, the following condition can be satisfied: $0.30<DM2M1i/DM2R4<1.00$. Therefore, it is favorable for reducing the thickness difference between the peripheral area and the central area of the first lens element by reducing the horizontal distance between the first reflective surface and the second reflective surface, thereby reducing stray light and simplifying the manufacturing difficulty. Moreover, the following condition can also be satisfied: $0.50<DM2M1i/DM2R4<0.95$. Moreover, the following condition can also be satisfied: $0.60<DM2M1i/DM2R4<0.92$. Moreover, the following condition can also be satisfied: $0.65<DM2M1i/DM2R4<0.90$. Moreover, the following condition can also be satisfied: $0.70\leq DM2M1i/DM2R4\leq 0.89$. Please refer to FIG. 25, which shows a schematic view of DM2M1i and DM2R4 according to the 1st embodiment of the present disclosure.

When an axial distance between the second reflective surface and an image surface is DM2I, and a focal length of the photography optical lens assembly is f, the following condition can be satisfied: $0.35<DM2I/f<0.80$. Therefore, it is favorable for achieving an ultra-thin optical system with a telephoto specification, thereby reducing the overall size of the photography optical lens assembly. Moreover, the following condition can also be satisfied: $0.40<DM2I/f<0.60$. Moreover, the following condition can also be satisfied: $0.43<DM2I/f<0.55$. Moreover, the following condition can also be satisfied: $0.47\leq DM2I/f\leq 0.51$. Please refer to FIG. 25, which shows a schematic view of DM2I according to the 1st embodiment of the present disclosure.

When a curvature radius of the object-side surface of the second lens element is R3, and a curvature radius of the image-side surface of the second lens element is R4, the following condition can be satisfied: $0.10<(R3+R4)/(R3-R4)<5.00$. Therefore, it is favorable for effectively balancing the curvature radii of the object-side surface and the image-side surface of the second lens element so as to adjust the travelling direction of peripheral light, thereby correcting aberrations of the photography optical lens assembly and reducing stray light inside the optical lens. Moreover, the following condition can also be satisfied: $0.20<(R3+R4)/(R3-R4)<3.00$. Moreover, the following condition can also be satisfied: $0.30<(R3+R4)/(R3-R4)<2.00$. Moreover, the following condition can also be satisfied: $0.37\leq(R3+R4)/(R3-R4)\leq 1.08$.

When a refractive index of the second lens element is N2, the following condition can be satisfied: $1.520<N2<1.750$. Therefore, it is favorable for adjusting the refractive index of the second lens element so as to control the travelling direction of reflected light, thereby adjusting the back focal length and increasing the image height. Moreover, the following condition can also be satisfied: $1.560<N2<1.720$. Moreover, the following condition can also be satisfied: $1.600<N2<1.700$. Moreover, the following condition can also be satisfied: $1.614\leq N2\leq 1.686$.

When the curvature radius of the image-side surface of the second lens element is R4, and a curvature radius of the object-side surface of the fifth lens element is R9, the following condition can be satisfied: $-10.00<(R4+R9)/(R4-R9)<0$. Therefore, it is favorable for effectively balancing the curvature radii of the image-side surface of the second lens element and the object-side surface of the fifth lens element, such that the image-side surface of the second lens element can have a relatively strong deflection ability to control the direction of the optical path. Moreover, the following condition can also be satisfied: $-5.00<(R4+R9)/(R4-R9)<-0.05$. Moreover, the following condition can also be satisfied: $-3.00<(R4+R9)/(R4-R9)<-0.20$.

When an axial distance between the second reflective surface and the second refractive surface is DM2R2, a central thickness of the second lens element is CT2, a central thickness of the third lens element is CT3, a central thickness of the fourth lens element is CT4, and a central thickness of the fifth lens element is CT5, the following condition can be satisfied: $1.00<DM2R2/(CT2+CT3+CT4+CT5)<2.50$. Therefore, it is favorable for balancing the central thickness ratio between lens elements at the front end and the rear end so as to facilitate lens assembly and increase yield rate. Moreover, the following condition can also be satisfied: $1.05<DM2R2/(CT2+CT3+CT4+CT5)<2.00$. Please refer to FIG. 25, which shows a schematic view of DM2R2 according to the 1st embodiment of the present disclosure.

When a focal length of the second lens element is f2, and a focal length of the fifth lens element is f5, the following condition can be satisfied: $0<10\times|f2/f5|<9.00$. Therefore, it is favorable for having a relatively strong refractive power of the second lens element which is balanced by the fifth lens element, thereby reducing the total optical track length and correcting off-axial aberrations. Moreover, the following condition can also be satisfied: $0.01<10\times|f2/f5|<7.00$. Moreover, the following condition can also be satisfied: $0.20<10\times|f2/f5|<6.00$.

When an axial distance between the first lens element and the second lens element is T12, and an axial distance between the third lens element and the fourth lens element is T34, the following condition can be satisfied: $0<T12/T34<1.20$. Therefore, it is favorable for having sufficient space between the third lens element and the fourth lens element so as to achieve various application designs. Moreover, the following condition can also be satisfied: $0.01<T12/T34<1.00$. Moreover, the following condition can also be satisfied: $0.03<T12/T34<0.80$.

When a maximum effective radius of the first refractive surface is YT1o, and the axial distance between the second reflective surface and the second refractive surface is DM2R2, the following condition can be satisfied: $1.50<YT1o/DM2R2<3.00$. Therefore, it is favorable for having a proper aperture size and a proper ratio of lens thickness, thereby ensuring sufficient space for reflecting the incident light and also ensuring sufficient incident light amount. Moreover, the following condition can also be satisfied: $1.75<YT1o/DM2R2<2.50$. Please refer to FIG. 25 and FIG. 26, which respectively show schematic views of DM2R2 and YT1o according to the 1st embodiment of the present disclosure.

When a minimum effective radius of the first refractive surface is YT1i, and a maximum image height of the photography optical lens assembly (which can be half of a diagonal length of an effective photosensitive area of the image sensor) is ImgH, the following condition can be satisfied: $0.90<YT1i/ImgH<2.00$. Therefore, it is favorable for balancing the ratio between the first refractive surface and the image surface to receive a relatively large range of incident light amount, thereby maintaining sufficient image illuminance. Moreover, the following condition can also be satisfied: $1.00<YT1i/ImgH<1.50$. Please refer to FIG. 26, which shows a schematic view of YT1i according to the 1st embodiment of the present disclosure.

When the minimum effective radius of the first refractive surface is YT1i, and a maximum effective radius of the second refractive surface is YT2, the following condition can be satisfied: $1.20<YT1i/YT2<3.50$. Therefore, it is favorable for balancing the effective radius ratio between the first refractive surface and the second refractive surface, thereby preventing stray light while maintaining sufficient image brightness. Moreover, the following condition can also be satisfied: $1.50<YT1i/YT2<3.00$.

When an Abbe number of the second lens element is V2, and an Abbe number of the fourth lens element is V4, the following condition can be satisfied: $20.0<V2+V4<70.0$. Therefore, it is favorable for effectively correcting focus positions of light with different wavelengths so as to prevent overlapped images. Moreover, the following condition can also be satisfied: $30.0<V2+V4<65.0$.

When a curvature radius of the second reflective surface at the central axis is RM2, and the curvature radius of the image-side surface of the second lens element is R4, the following condition can be satisfied: $-0.10<(RM2+R4)/(RM2-R4)<1.00$. Therefore, it is favorable for effectively balancing the curvature radii of the second reflective surface and the image-side surface of the second lens element, thereby improving convergence quality of imaging light and thus effectively correcting curvature field and spherical aberration. Moreover, the following condition can also be satisfied: $0.00<(RM2+R4)/(RM2-R4)<0.80$. Moreover, the following condition can also be satisfied: $0.10<(RM2+R4)/(RM2-R4)<0.50$.

When the focal length of the photography optical lens assembly is f, the focal length of the second lens element is f2, a focal length of the third lens element is f3, a focal length of the fourth lens element is f4, and the focal length of the fifth lens element is f5, the following condition can be satisfied: $0.60<|f/f2|/(|f/f3|+|f/f4|+|f/f5|)<10.00$. Therefore, it is favorable for adjusting the refractive power of the second lens element so as to balance the convergence or divergence of light, thereby improving convergence quality of light from all fields of view. Moreover, the following condition can also be satisfied: $0.80<|f/f2|/(|f/f3|+|f/f4|+|f/f5|)<8.00$.

When the axial distance between the third lens element and the fourth lens element is T34, and an axial distance between the fourth lens element and the fifth lens element is T45, the following condition can be satisfied: $0.05<T45/T34<2.50$. Therefore, it is favorable for controlling the ratio between the interval of the third lens element and the fourth lens element and the interval of the fourth lens element and the fifth lens element, thereby increasing space utilization and reducing manufacturing tolerance. Moreover, the following condition can also be satisfied: $0.10<T45/T34<1.50$. Moreover, the following condition can also be satisfied: $0.20<T45/T34<1.00$.

When the focal length of the photography optical lens assembly is f, the maximum effective radius of the first refractive surface is YT1o, and the minimum effective radius of the first refractive surface is YT1i, the following condition can be satisfied: $1.00<0.5\times f/\sqrt{YT1o^2-YT1i^2}<2.00$. Therefore, it is favorable for obtaining a proper balance between the illuminance and the depth of view and also increasing incident light amount to improve image quality. Moreover, the following condition can also be satisfied: $1.20<0.5\times f/\sqrt{YT1o^2-YT1i^2}<1.85$.

When a displacement in parallel with the central axis from an axial vertex on the object-side surface of the fourth lens element to a maximum effective radius position on the object-side surface of the fourth lens element is Sag4R1, and the central thickness of the fourth lens element is CT4, the following condition can be satisfied: $-2.00<\text{Sag4R1}/\text{CT4}<-0.20$. Therefore, it is favorable for correcting peripheral aberrations of the photography optical lens assembly and controlling the lens thickness. Moreover, the following condition can also be satisfied: $-1.50<\text{Sag4R1}/\text{CT4}<-0.30$. Please refer to FIG. 25, which shows a schematic view of Sag4R1 according to the 1st embodiment of the present disclosure. When the direction from the axial vertex of one surface to the maximum effective radius position of the same surface is facing towards the image side of the photography optical lens assembly, the value of displacement is positive; when the direction from the axial vertex of the surface to the maximum effective radius position of the same surface is facing towards the object side of the photography optical lens assembly, the value of displacement is negative.

When the minimum effective radius of the first refractive surface is YT1i, the maximum effective radius of the second refractive surface is YT2, and the axial distance between the second reflective surface and the second refractive surface is DM2R2, the following condition can be satisfied: $0.20<(\text{YT1i}-\text{YT2})/\text{DM2R2}<1.00$. Therefore, it is favorable for effectively preventing light with a relatively large incident angle from directly emitting onto the image surface so as to prevent ghost image. Moreover, the following condition can also be satisfied: $0.38<(\text{YT1i}-\text{YT2})/\text{DM2R2}<0.80$.

When a maximum effective radius of the second reflective surface is YM2, and the maximum effective radius of the second refractive surface is YT2, the following condition can be satisfied: $1.20<\text{YM2}/\text{YT2}<2.50$. Therefore, it is favorable for balancing the effective radius ratio between the second reflective surface and the second refractive surface, thereby maintaining the aperture size for entering the second lens element and preventing stray light generated at the periphery. Moreover, the following condition can also be satisfied: $1.45<\text{YM2}/\text{YT2}<2.20$. Please refer to FIG. 26, which shows a schematic view of YM2 and YT2 according to the 1st embodiment of the present disclosure.

When an Abbe number of the third lens element is V3, the following condition can be satisfied: $10.0<V3<21.0$. Therefore, a proper material selection of the third lens element is favorable for correcting chromatic aberration. Moreover, the following condition can also be satisfied: $15.0<V3<20.0$.

According to the present disclosure, the aforementioned features and conditions can be utilized in numerous combinations so as to achieve corresponding effects.

According to the present disclosure, the lens elements of the photography optical lens assembly can be made of either glass or plastic material. When the lens elements are made of glass material, the refractive power distribution of the photography optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the photography optical lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the central axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the central axis.

According to the present disclosure, the image surface of the photography optical lens assembly, based on the corresponding image sensor, can be flat or curved, especially a curved surface being concave facing towards the object side of the photography optical lens assembly.

According to the present disclosure, an image correction unit, such as a field flattener, can be optionally disposed between the lens element closest to the image side of the photography optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photography optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photography optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photography optical lens assembly and thereby provides a wider field of view for the same.

According to the present disclosure, the photography optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the photography optical lens assembly can include one or more optical elements for limiting the form of light passing through the photography optical lens assembly. Each optical element can be, but not limited to, a filter, a polarizer, etc., and each optical element can be, but not limited to, a single-piece element, a composite component, a thin film, etc. The optical element can be located at the object side or the image side of the photography optical lens assembly or between any two adjacent lens elements so as to allow light in a specific form to pass through, thereby meeting application requirements.

According to the present disclosure, the photography optical lens assembly can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the object side and the image side are defined in accordance with the direction of the central axis, and the axial optical data are calculated along the central axis.

According to the above description of the present disclosure, the following specific embodiments are provided for further explanation.

1st Embodiment

Figure 1:
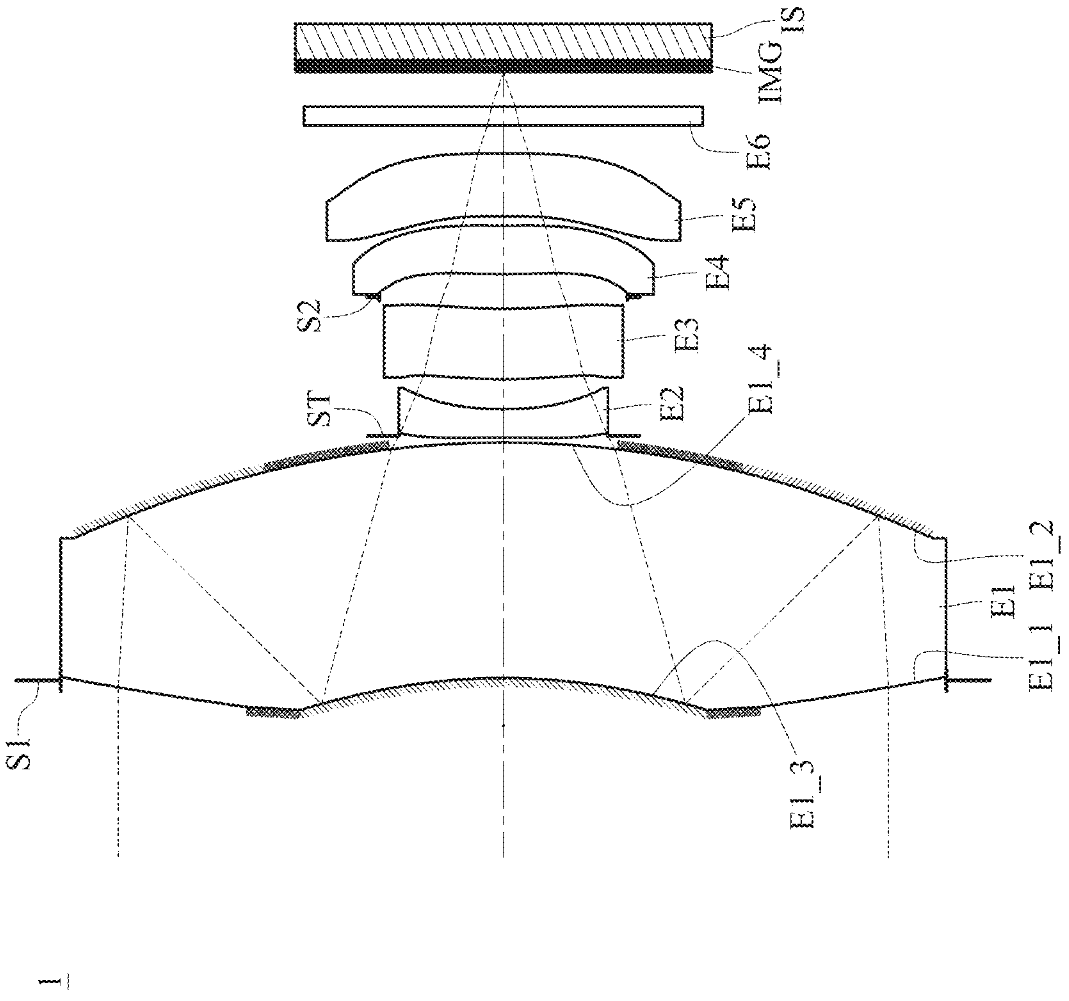
FIG. 1 is a schematic view of an image capturing unit according to the 1st embodiment of the present disclosure.
Figure 2:
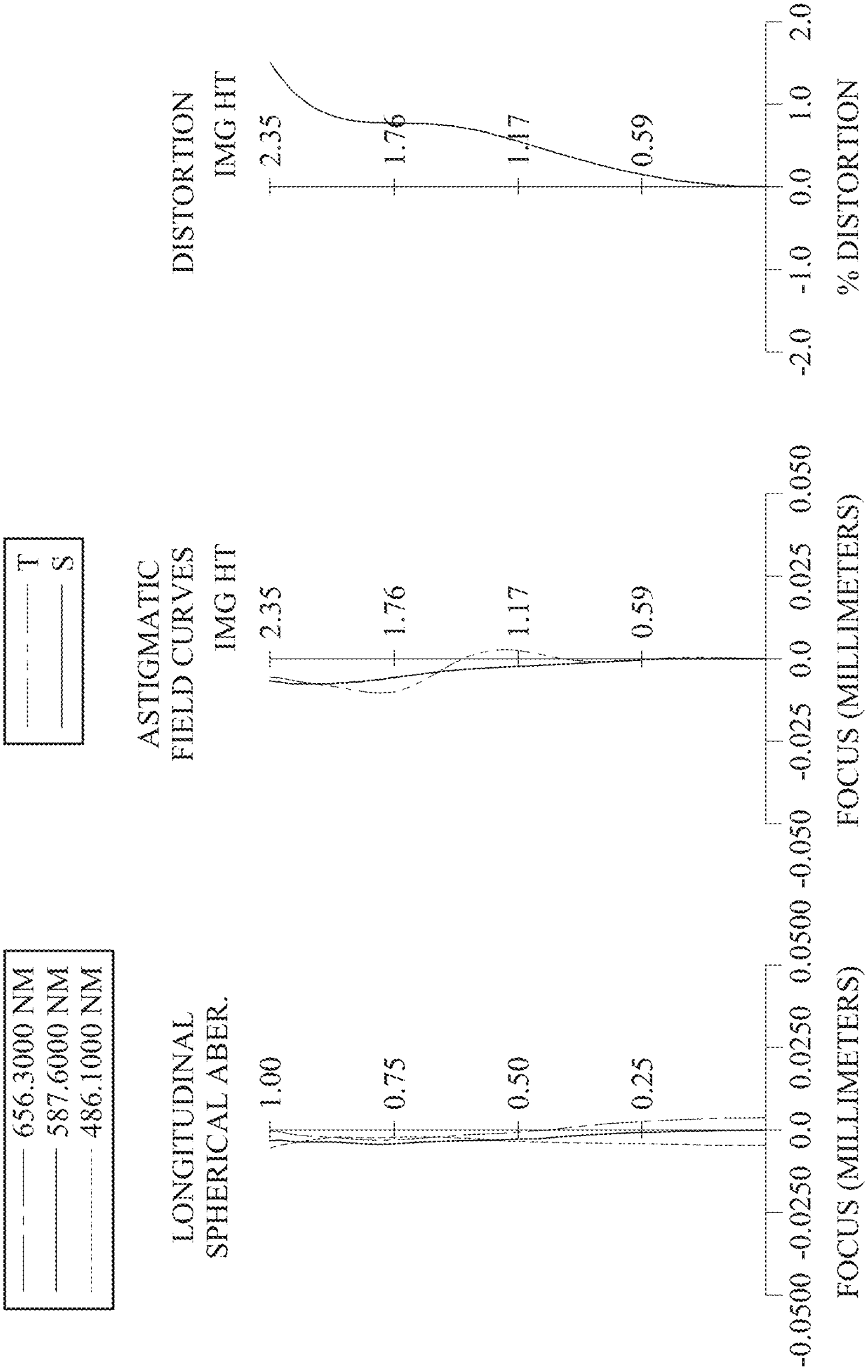
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a stop S2, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point and one concave critical point in an off-axis region thereof.

The fourth lens element E4 with positive refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point. The object-side surface of the fourth lens element E4 has one concave critical point in an off-axis region thereof. The image-side surface of the fourth lens element E4 has one convex critical point in an off-axis region thereof.

The fifth lens element E5 with negative refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point. The object-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The equation of the aspheric surface profiles of the aforementioned lens elements of the 1st embodiment is expressed as follows:

$$X(Y)=(Y^2/R)/(1+sqrt(1-(1+k)\times(Y/R)^2))+\sum_i(Ai)\times(Y^i),$$

where,

X is the displacement in parallel with the central axis from an axial vertex on the aspheric surface to a point at a distance of Y from the central axis on the aspheric surface;

Y is the vertical distance from the point on the aspheric surface to the central axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photography optical lens assembly of the image capturing unit 1 according to the 1st embodiment, when a focal length of the photography optical lens assembly is f, an f-number of the photography optical lens assembly is Fno, and half of a maximum field of view of the photography optical lens assembly is HFOV, these parameters have the following values: f=13.48 millimeters (mm), Fno=1.66, and HFOV=9.7 degrees (deg.). Noted that said Fno in the present disclosure can refer to an equivalent f-number which is calculated by the following formula:

$$0.5\times f\Big/\sqrt{YT1o^2-YT1i^2}.$$

When an axial distance between the second reflective surface E1_3 and the image surface IMG is DM2I, and the focal length of the photography optical lens assembly is f, the following condition is satisfied: DM2I/f=0.51.

When the focal length of the photography optical lens assembly is f, a focal length of the second lens element E2 is f2, a focal length of the third lens element E3 is f3, a focal length of the fourth lens element E4 is f4, and a focal length of the fifth lens element E5 is f5, the following condition is satisfied: |f/f2|/(|f/f3|+|f/f4|+|f/f5|)=4.38.

When the focal length of the second lens element E2 is f2, and the focal length of the fifth lens element E5 is f5, the following condition is satisfied: 10×|f2/f5|=0.58.

When a curvature radius of the second reflective surface E1_3 at the central axis is RM2, and a curvature radius of the image-side surface of the second lens element E2 is R4, the following condition is satisfied: (RM2+R4)/(RM2−R4)=0.28.

When a curvature radius of the object-side surface of the second lens element E2 is R3, and the curvature radius of the image-side surface of the second lens element E2 is R4, the following condition is satisfied: (R3+R4)/(R3−R4)=0.58.

When the curvature radius of the image-side surface of the second lens element E2 is R4, and a curvature radius of the object-side surface of the fifth lens element E5 is R9, the following condition is satisfied: (R4+R9)/(R4−R9)=−0.66.

When a distance in parallel with the central axis between an axial vertex on the second reflective surface E1_3 and a minimum effective radius position on the first reflective surface E1_2 is DM2M1i, and an axial distance between the second reflective surface E1_3 and the image-side surface of the second lens element E2 is DM2R4, the following condition is satisfied: DM2M1i/DM2R4=0.77. In this embodiment, an axial distance between two adjacent lens elements is a distance in a paraxial region between two adjacent lens surfaces of the two adjacent lens elements.

When an axial distance between the second reflective surface E1_3 and the second refractive surface E1_4 is DM2R2, a central thickness of the second lens element E2 is CT2, a central thickness of the third lens element E3 is CT3, a central thickness of the fourth lens element E4 is CT4, and a central thickness of the fifth lens element E5 is CT5, the following condition is satisfied: DM2R2/(CT2+CT3+CT4+CT5)=1.12.

When an axial distance between the first lens element E1 and the second lens element E2 is T12, and an axial distance between the third lens element E3 and the fourth lens element E4 is T34, the following condition is satisfied: T12/T34=0.15.

When the axial distance between the third lens element E3 and the fourth lens element E4 is T34, and an axial distance between the fourth lens element E4 and the fifth lens element E5 is T45, the following condition is satisfied: T45/T34=0.27.

When a refractive index of the second lens element E2 is N2, the following condition is satisfied: N2=1.639.

When an Abbe number of the second lens element E2 is V2, and an Abbe number of the fourth lens element E4 is V4, the following condition is satisfied: V2+V4=60.9.

When an Abbe number of the third lens element E3 is V3, the following condition is satisfied: V3=19.5.

When a displacement in parallel with the central axis from an axial vertex on the object-side surface of the fourth lens element E4 to a maximum effective radius position on the object-side surface of the fourth lens element E4 is Sag4R1, and the central thickness of the fourth lens element E4 is CT4, the following condition is satisfied: Sag4R1/CT4=−0.42.

When a maximum effective radius of the first refractive surface E1_1 is YT1o, the following condition is satisfied: YT1o=5.00 mm.

When a minimum effective radius of the first refractive surface E1_1 is YT1i, the following condition is satisfied: YT1i=2.90 mm.

When a maximum effective radius of the first reflective surface E1_2 is YM1o, the following condition is satisfied: YM1o=4.85 mm. Please refer to FIG. 26, which shows a schematic view of YM1o according to the 1st embodiment of the present disclosure.

When a minimum effective radius of the first reflective surface E1_2 is YM1i, the following condition is satisfied: YM1i=2.70 mm. Please refer to FIG. 26, which shows a schematic view of YM1 i according to the 1st embodiment of the present disclosure.

When a maximum effective radius of the second reflective surface E1_3 is YM2, the following condition is satisfied: YM2=2.30 mm.

When a maximum effective radius of the second refractive surface E1_4 is YT2, the following condition is satisfied: YT2=1.29 mm.

When the focal length of the photography optical lens assembly is f, the maximum effective radius of the first refractive surface E1_1 is YT1o, and the minimum effective radius of the first refractive surface E1_1 is YT1i, the following condition is satisfied: $0.5\times f/\sqrt{YT1o^2-YT1i^2}=1.66$.

When the maximum effective radius of the first refractive surface E1_1 is YT1o, and the axial distance between the second reflective surface E1_3 and the second refractive surface E1_4 is DM2R2, the following condition is satisfied: YT1o/DM2R2=1.88.

When the minimum effective radius of the first refractive surface E1_1 is YT1i, the maximum effective radius of the second refractive surface E1_4 is YT2, and the axial distance between the second reflective surface E1_3 and the second refractive surface E1_4 is DM2R2, the following condition is satisfied: (YT1i-YT2)/DM2R2=0.61.

When the minimum effective radius of the first refractive surface E1_1 is YT1i, and a maximum image height of the photography optical lens assembly is ImgH, the following condition is satisfied: YT1i/ImgH=1.23.

When the minimum effective radius of the first refractive surface E1_1 is YT1i, and the maximum effective radius of the second refractive surface E1_4 is YT2, the following condition is satisfied: YT1i/YT2=2.25.

When the maximum effective radius of the second reflective surface E1_3 is YM2, and the maximum effective radius of the second refractive surface E1_4 is YT2, the following condition is satisfied: YM2/YT2=1.78.

The detailed optical data of the 1st embodiment are shown in Table 1A and the aspheric surface data are shown in Table 1B below.

TABLE 1A

| 1st Embodiment<br>f = 13.48 mm, Fno = 1.66, HFOV = 9.7 deg. | | | | | | | | |
|---|---|---|---|---|---|---|---|---|
| Surface-# | | Curvature Radius | Thickness | Material | Index | Abbe # | Refractive/Reflective | Focal Length |
| 0 | Object | Plano | Infinity | | | | Refractive | |
| 1 | Stop | Plano | −0.512 | | | | Refractive | |
| 2 | Lens 1 peripheral area | 18.1592 (ASP) | 3.198 | Plastic | 1.534 | 56.0 | Refractive | — |
| 3 | | −10.8808 (ASP) | −2.659 | Plastic | 1.534 | 56.0 | Reflective | — |
| 4 | Lens 1 central area | −6.8456 (ASP) | 2.659 | Plastic | 1.534 | 56.0 | Reflective | — |
| 5 | | −10.8808 (ASP) | 0.077 | | | | Refractive | |
| 6 | Ape. Stop | Plano | −0.020 | | | | Refractive | |
| 7 | Lens 2 | −14.5998 (ASP) | 0.320 | Plastic | 1.639 | 23.5 | Refractive | −4.76 |
| 8 | | 3.8672 (ASP) | 0.338 | | | | Refractive | |
| 9 | Lens 3 | 5.7133 (ASP) | 0.796 | Plastic | 1.669 | 19.5 | Refractive | 102.13 |
| 10 | | 5.8864 (ASP) | 0.131 | | | | Refractive | |
| 11 | Stop | Plano | 0.261 | | | | Refractive | |
| 12 | Lens 4 | 11.2329 (ASP) | 0.547 | Plastic | 1.566 | 37.4 | Refractive | 38.61 |
| 13 | | 22.7042 (ASP) | 0.106 | | | | Refractive | |
| 14 | Lens 5 | −19.1327 (ASP) | 0.710 | Plastic | 1.544 | 56.0 | Refractive | −81.60 |
| 15 | | −34.0625 (ASP) | 0.316 | | | | Refractive | |
| 16 | Filter | Plano | 0.210 | Glass | 1.517 | 64.2 | Refractive | — |
| 17 | | Plano | 0.393 | | | | Refractive | |
| 18 | Image | Plano | — | | | | Refractive | |

Note:
Reference wavelength is 587.6 nm (d-line).
An effective radius of the stop S1 (Surface 1) is 5.000 mm.
An effective radius of the stop S2 (Surface 11) is 1.400 mm.

TABLE 1B

| Aspheric Coefficients | | | | |
|---|---|---|---|---|
| Surface # | 2 | 3 | 4 | 5 |
| k = | −5.739510E+00 | −4.231530E−01 | −3.515020E+00 | −4.231530E−01 |
| A4 = | −1.640017E−04 | 4.478148E−05 | 2.145081E−05 | 4.478148E−05 |
| A6 = | −1.743296E−06 | −2.193771E−07 | 3.291612E−06 | −2.193771E−07 |
| A8 = | 1.151288E−07 | 1.272160E−07 | −1.606579E−06 | 1.272160E−07 |
| A10 = | — | −1.566711E−08 | −4.008561E−08 | −1.566711E−08 |
| A12 = | — | 1.499939E−09 | — | 1.499939E−09 |

TABLE 1B-continued

| Aspheric Coefficients | | | | |
|---|---|---|---|---|
| A14 = | — | −8.999809E−11 | — | −8.999809E−11 |
| A16 = | — | 3.265189E−12 | — | 3.265189E−12 |
| A18 = | — | −6.537292E−14 | — | −6.537292E−14 |
| A20 = | — | 5.539970E−16 | — | 5.539970E−16 |
| Surface # | 7 | 8 | 9 | 10 |
| k = | −4.359600E+01 | 3.837730E+00 | 1.467890E+01 | 7.688420E+00 |
| A4 = | 7.387749E−02 | 5.263510E−02 | −5.839365E−02 | −5.364493E−02 |
| A6 = | −4.205655E−02 | 1.618498E−03 | 4.625167E−02 | 3.088189E−02 |
| A8 = | 4.964857E−02 | −1.620746E−01 | −2.662708E−01 | −7.913994E−02 |
| A10 = | −8.267615E−02 | 5.832587E−01 | 8.413150E−01 | 1.484795E−01 |
| A12 = | 1.264674E−01 | −1.201303E+00 | −1.664632E+00 | −1.915425E−01 |
| A14 = | −1.319773E−01 | 1.527094E+00 | 2.032529E+00 | 1.596348E−01 |
| A16 = | 8.506390E−02 | −1.177796E+00 | −1.498088E+00 | −8.162079E−02 |
| A18 = | −3.042922E−02 | 5.041813E−01 | 6.106219E−01 | 2.321389E−02 |
| A20 = | 4.617466E−03 | −9.188219E−02 | −1.058167E−01 | −2.760684E−03 |
| Surface # | 12 | 13 | 14 | 15 |
| k = | 1.350940E+01 | 9.252880E+01 | −8.500270E+01 | 7.300640E+01 |
| A4 = | −7.070287E−02 | −1.488080E−01 | −1.589637E−01 | −7.005887E−02 |
| A6 = | 2.695266E−02 | 8.422174E−02 | 1.064219E−01 | 3.382302E−02 |
| A8 = | −6.476633E−02 | −4.375346E−02 | −6.119074E−02 | −2.056531E−02 |
| A10 = | 1.162590E−01 | 3.764548E−02 | 7.745970E−02 | 1.304671E−02 |
| A12 = | −1.549235E−01 | −2.750829E−02 | −7.076763E−02 | −7.573650E−03 |
| A14 = | 1.278543E−01 | 9.998981E−03 | 3.471282E−02 | 3.088663E−03 |
| A16 = | −6.290082E−02 | −1.570234E−03 | −9.295194E−03 | −7.769024E−04 |
| A18 = | 1.676199E−02 | 7.011308E−05 | 1.296845E−03 | 1.075735E−04 |
| A20 = | −1.817456E−03 | — | −7.416027E−05 | −6.194237E−06 |

In Table 1A, the curvature radius, the thickness and the focal length are shown in millimeters (mm). Surface numbers 0-18 represent the surfaces sequentially arranged from the object side to the image side along the central axis. In Table 1B, k represents the conic coefficient of the equation of the aspheric surface profiles. A4-A20 represent the aspheric coefficients ranging from the 4th order to the 20th order.

The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
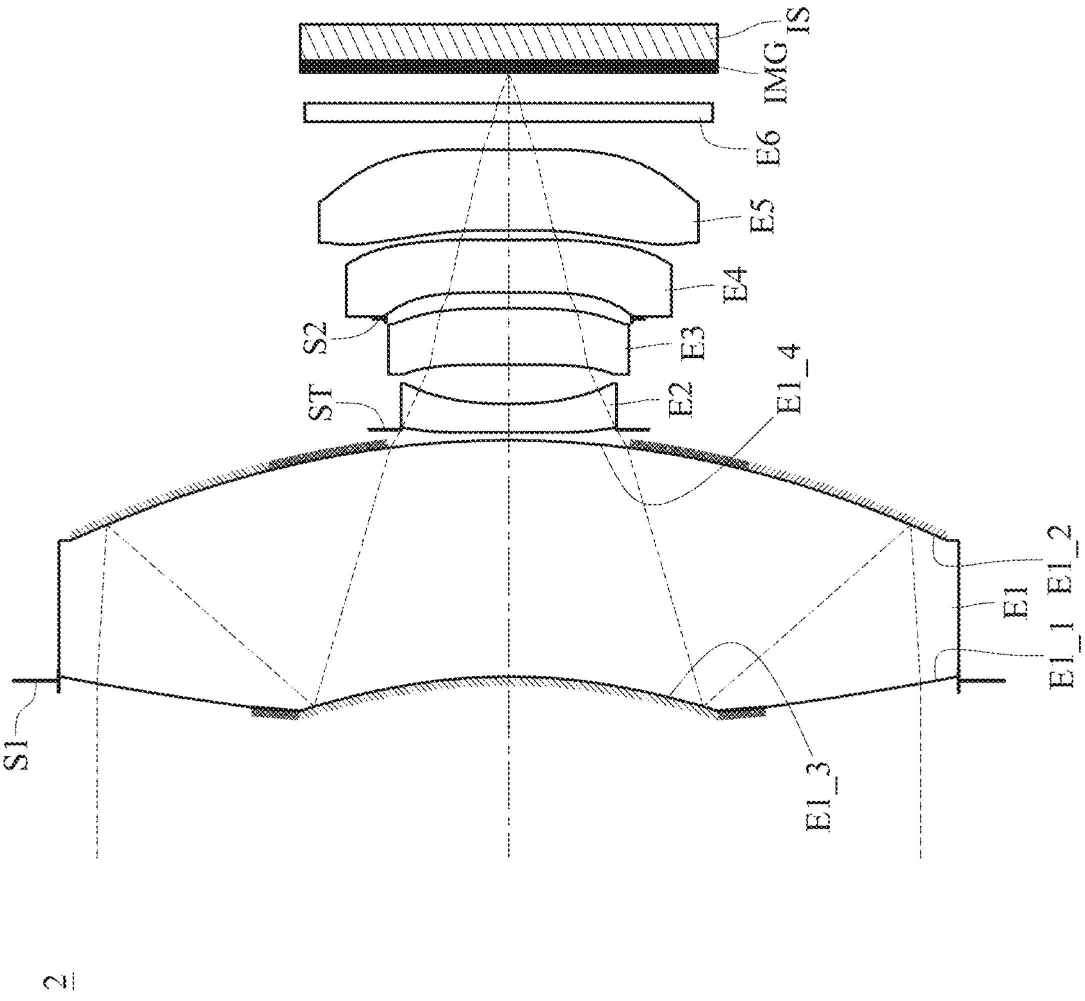
FIG. 3 is a schematic view of an image capturing unit according to the 2nd embodiment of the present disclosure.
Figure 4:
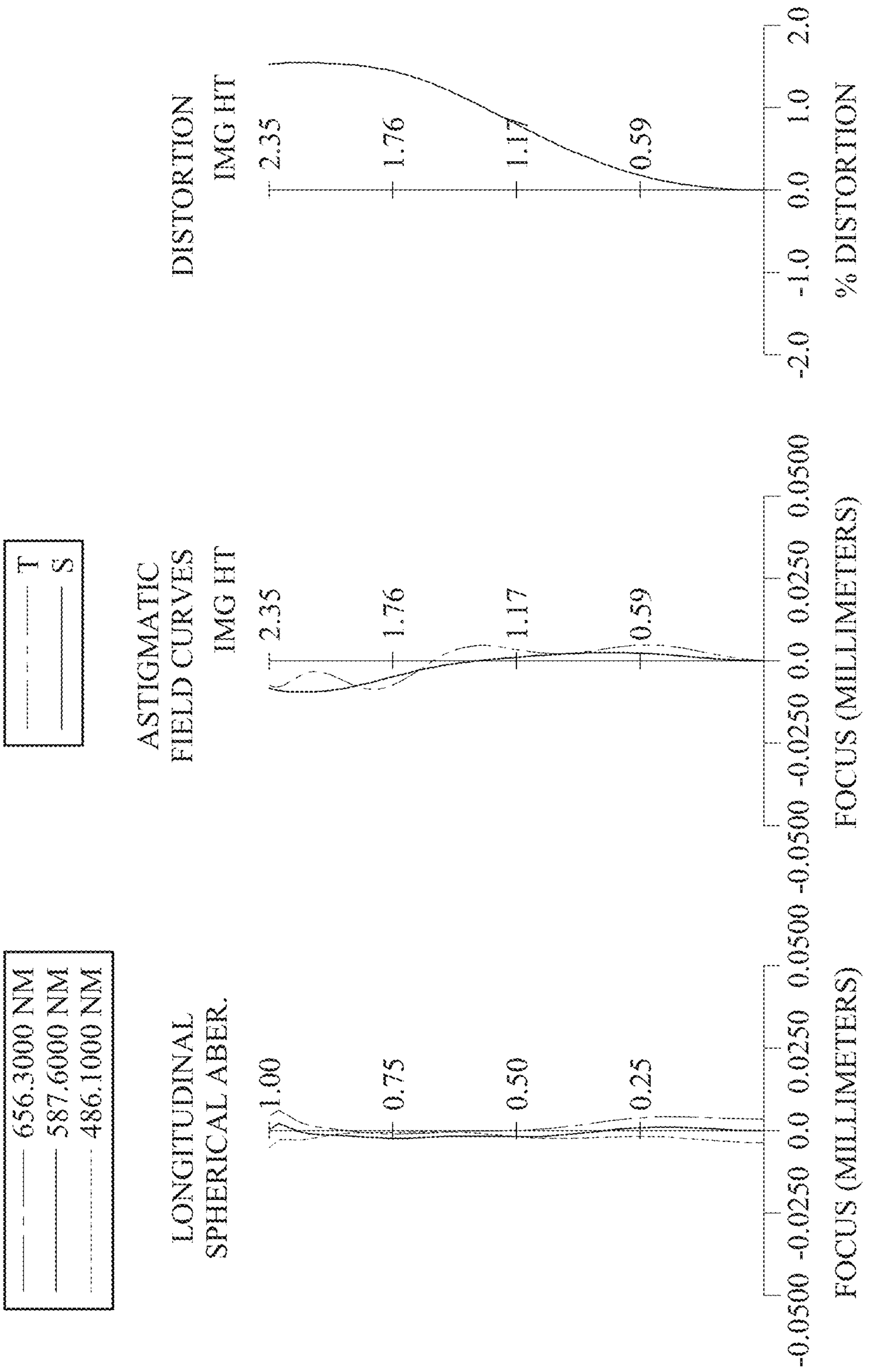
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a stop S2, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one convex critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric. The image-side surface of the third lens element E3 has one inflection point.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point. The image-side surface of the fourth lens element E4 has one convex critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has two inflection points. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 2nd embodiment are shown in Table 2A and the aspheric surface data are shown in Table 2B below.

TABLE 2A

2nd Embodiment
f = 13.48 mm, Fno = 1.62, HFOV = 9.7 deg.

| Surface # | | Curvature Radius | Thickness | Material | Index | Abbe # | Refractive/Reflective | Focal Length |
|---|---|---|---|---|---|---|---|---|
| 0 | Object | Plano | Infinity | | | | Refractive | |
| 1 | Stop | Plano | −0.512 | | | | Refractive | |
| 2 | Lens 1 peripheral area | 18.3170 (ASP) | 3.226 | Plastic | 1.534 | 56.0 | Refractive | — |
| 3 | | −10.7820 (ASP) | −2.669 | Plastic | 1.534 | 56.0 | Reflective | — |
| 4 | Lens 1 central area | −6.6586 (ASP) | 2.669 | Plastic | 1.534 | 56.0 | Reflective | — |
| 5 | | −10.7820 (ASP) | 0.120 | | | | Refractive | |
| 6 | Ape. Stop | Plano | −0.030 | | | | Refractive | |
| 7 | Lens 2 | −19.1432 (ASP) | 0.320 | Plastic | 1.639 | 23.5 | Refractive | −5.82 |
| 8 | | 4.6425 (ASP) | 0.445 | | | | Refractive | |
| 9 | Lens 3 | −54.6394 (ASP) | 0.637 | Plastic | 1.669 | 19.5 | Refractive | 37.24 |
| 10 | | −17.1907 (ASP) | −0.123 | | | | Refractive | |
| 11 | Stop | Plano | 0.302 | | | | Refractive | |
| 12 | Lens 4 | −92.2407 (ASP) | 0.590 | Plastic | 1.669 | 19.5 | Refractive | −17.70 |
| 13 | | 13.6245 (ASP) | 0.108 | | | | Refractive | |
| 14 | Lens 5 | 21.2204 (ASP) | 0.913 | Plastic | 1.544 | 56.0 | Refractive | −1035.54 |
| 15 | | 20.1401 (ASP) | 0.316 | | | | Refractive | |
| 16 | Filter | Plano | 0.210 | Glass | 1.517 | 64.2 | Refractive | — |
| 17 | | Plano | 0.347 | | | | Refractive | |
| 18 | Image | Plano | — | | | | Refractive | |

Note:
Reference wavelength is 587.6 nm (d-line).
An effective radius of the stop S1 (Surface 1) is 5.080 mm.
An effective radius of the stop S2 (Surface 11) is 1.388 mm.

TABLE 2B

Aspheric Coefficients

| Surface # | 2 | 3 | 4 | 5 |
|---|---|---|---|---|
| k = | −5.919540E+00 | −4.311010E−01 | −3.631060E+00 | −4.311010E−01 |
| A4 = | −1.744132E−04 | 4.423970E−05 | −1.817261E−05 | 4.423970E−05 |
| A6 = | −1.162321E−06 | −7.951246E−07 | 2.923847E−05 | −7.951246E−07 |
| A8 = | 1.081861E−07 | 2.889572E−07 | −4.066202E−06 | 2.889572E−07 |
| A10 = | — | −3.532158E−08 | 5.020300E−08 | −3.532158E−08 |
| A12 = | — | 2.932478E−09 | — | 2.932478E−09 |
| A14 = | — | −1.542734E−10 | — | −1.542734E−10 |
| A16 = | — | 4.981527E−12 | — | 4.981527E−12 |
| A18 = | — | −8.999485E−14 | — | −8.999485E−14 |
| A20 = | — | 6.960462E−16 | — | 6.960462E−16 |

| Surface # | 7 | 8 | 9 | 10 |
|---|---|---|---|---|
| k = | 5.256030E+01 | 4.278310E+00 | −9.900000E+01 | 9.773840E+01 |
| A4 = | 7.172659E−02 | 6.816544E−02 | −2.584337E−02 | −3.303796E−02 |
| A6 = | −4.905401E−02 | −5.871489E−02 | −2.094437E−02 | −9.969610E−03 |
| A8 = | 6.809796E−02 | 8.653535E−02 | −4.506513E−03 | −7.597106E−02 |
| A10 = | −1.071182E−01 | −1.173374E−01 | 6.278993E−02 | 2.524346E−01 |
| A12 = | 1.437887E−01 | 6.217741E−02 | −1.654804E−01 | −4.063584E−01 |
| A14 = | −1.364189E−01 | 7.264059E−02 | 2.236766E−01 | 3.809528E−01 |

TABLE 2B-continued

| Aspheric Coefficients | | | | |
|---|---|---|---|---|
| A16 = | 8.320681E−02 | −1.378011E−01 | −1.716262E−01 | −2.077536E−01 |
| A18 = | −2.891552E−02 | 8.235875E−02 | 7.060266E−02 | 6.100527E−02 |
| A20 = | 4.324376E−03 | −1.755702E−02 | −1.193064E−02 | −7.380474E−03 |
| Surface # | 12 | 13 | 14 | 15 |
| k = | 1.224940E+01 | 5.148360E+01 | 2.569550E+01 | 3.132440E+01 |
| A4 = | −4.579563E−02 | −1.324289E−01 | −1.798486E−01 | −7.566468E−02 |
| A6 = | −1.206768E−02 | 1.064683E−01 | 1.428503E−01 | 3.182916E−02 |
| A8 = | −1.869671E−02 | −4.824660E−02 | −5.722705E−02 | −1.683195E−02 |
| A10 = | 8.031506E−02 | 9.930343E−03 | 2.219620E−02 | 8.429523E−03 |
| A12 = | −1.474377E−01 | −7.917673E−04 | −1.489004E−02 | −3.770864E−03 |
| A14 = | 1.415124E−01 | −4.262143E−05 | 7.544470E−03 | 1.241848E−03 |
| A16 = | −7.404856E−02 | 4.377235E−05 | −2.059997E−03 | −2.621262E−04 |
| A18 = | 1.995187E−02 | −9.122930E−06 | 2.818985E−04 | 3.109095E−05 |
| A20 = | −2.138711E−03 | — | −1.535295E−05 | −1.546415E−06 |

In the 2nd embodiment, the equation of the aspheric surface profiles of the aforementioned lens elements is the same as the equation of the 1st embodiment. Also, the definitions of these parameters shown in Table 20 are the same as those stated in the 1 st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Schematic Parameters | | | |
|---|---|---|---|
| f [mm] | 13.48 | V3 | 19.5 |
| Fno | 1.62 | Sag4R1/CT4 | −0.46 |
| HFOV [deg.] | 9.7 | YT1o [mm] | 5.08 |
| DM2I/f | 0.51 | YT1i [mm] | 2.90 |
| \|f/f2\|/(\|f/f3\| + \|f/f4\| + \|f/f5\|) | 2.04 | YM1o [mm] | 4.95 |
| 10 × \|f2/f5 | 0.06 | YM1i [mm] | 2.70 |
| (RM2 + R4)/(RM2 − R4) | 0.18 | YM2 [mm] | 2.37 |
| (R3 + R4)/(R3 − R4) | 0.61 | YT2 [mm] | 1.35 |
| (R4 + R9)/(R4− R9) | −1.56 | $0.5 \times f/\sqrt{YT1o^2 - YT1i^2}$ | 1.62 |
| DM2M1i/DM2R4 | 0.76 | YT1o/DM2R2 | 1.90 |
| DM2R2/(CT2 + CT3 + CT4 + CT5) | 1.08 | (YT1i − YT2)/DM2R2 | 0.58 |
| T12/T34 | 0.50 | YT1i/ImgH | 1.23 |
| T45/T34 | 0.60 | YT1i/YT2 | 2.14 |
| N2 | 1.639 | YM2/YT2 | 1.75 |
| V2 + V4 | 43.0 | — | — |

3rd Embodiment

Figure 5:
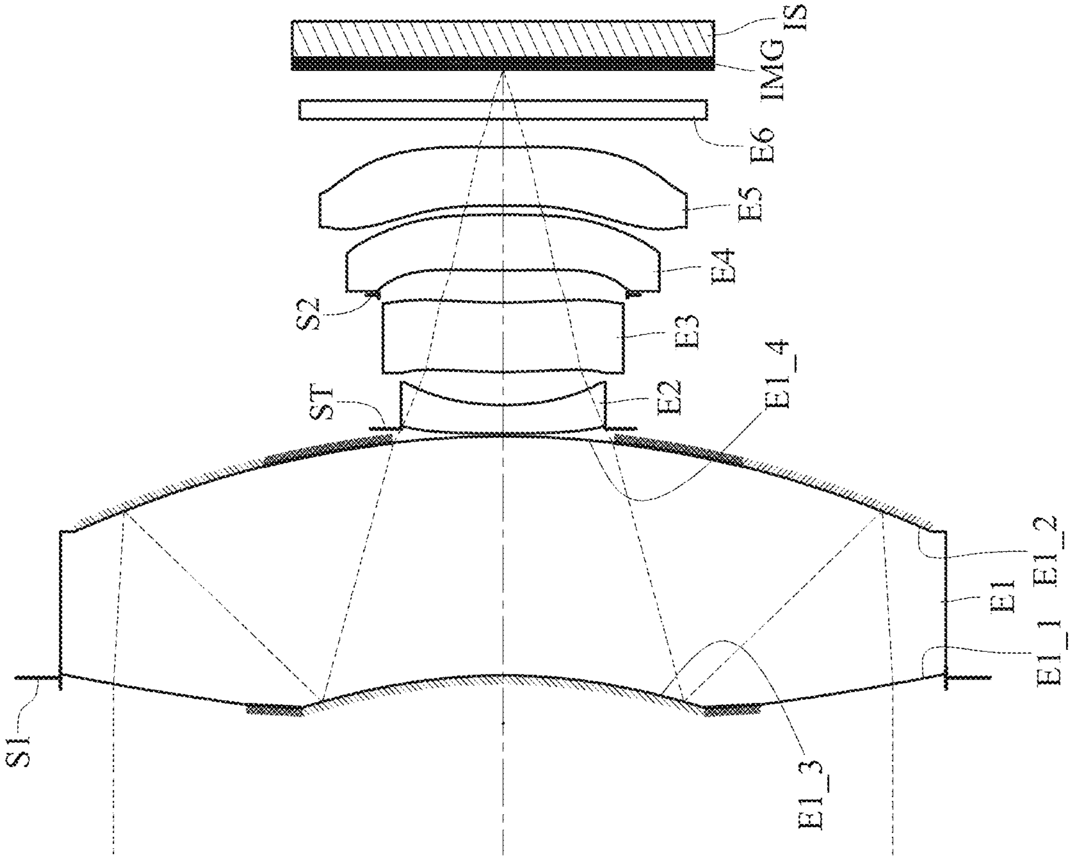
FIG. 5 is a schematic view of an image capturing unit according to the 3rd embodiment of the present disclosure.
Figure 6:
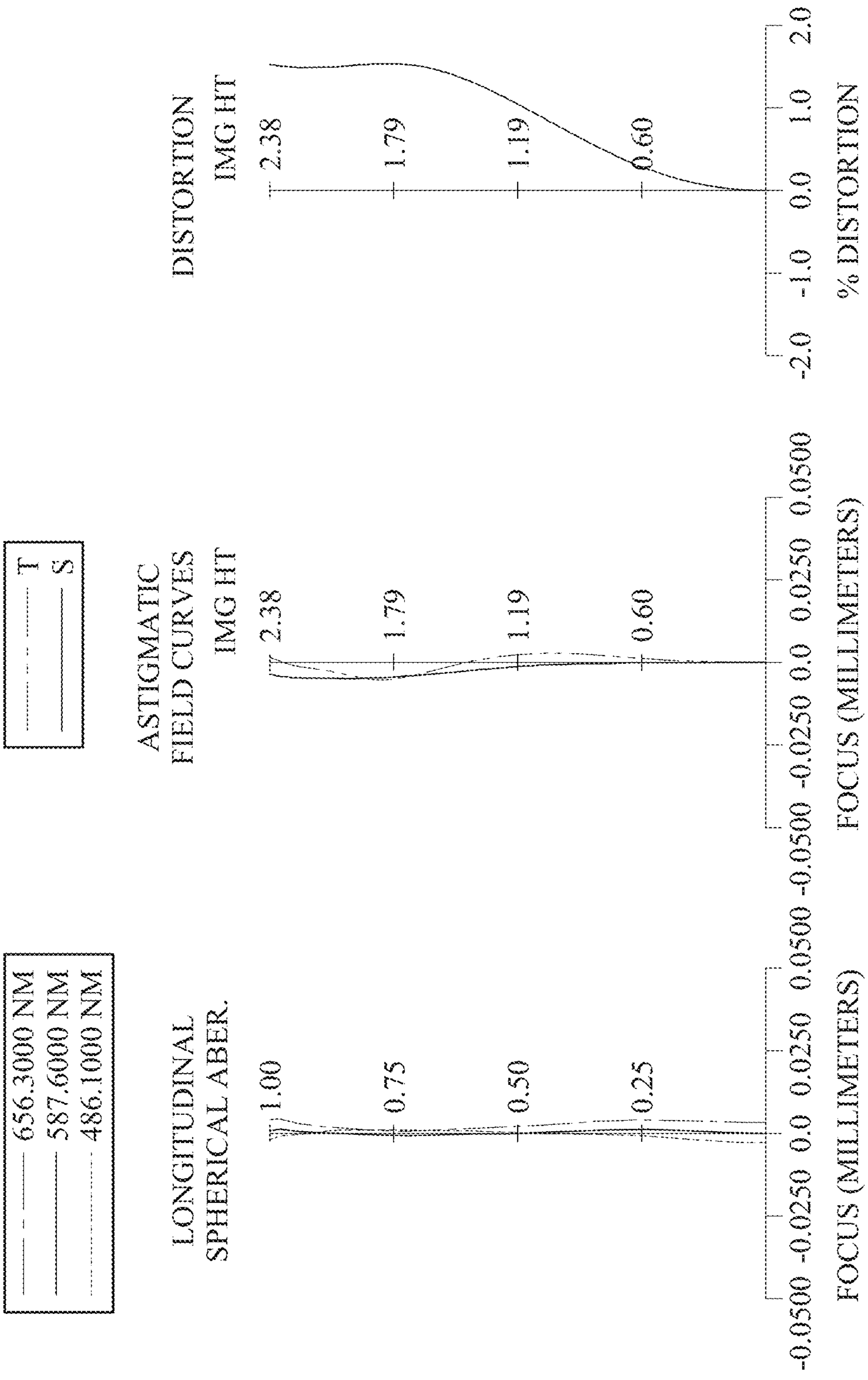
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a stop S2, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The image-side surface of the second lens element E2 has one inflection point.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The object-side surface of the fourth lens element E4 has one concave critical point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has two inflection points. The object-side surface of the fifth lens element E5 has one convex critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 3rd embodiment are shown in Table 3A and the aspheric surface data are shown in Table 3B below.

TABLE 3A

3rd Embodiment
f = 13.64 mm, Fno = 1.68, HFOV = 9.7 deg.

| Surface # | | Curvature Radius | | Thickness | Material | Index | Abbe # | Refractive/ Reflective | Focal Length |
|---|---|---|---|---|---|---|---|---|---|
| 0 | Object | Plano | | Infinity | | | | Refractive | |
| 1 | Stop | Plano | | −0.512 | | | | Refractive | |
| 2 | Lens 1 peripheral area | 18.4145 | (ASP) | 3.238 | Plastic | 1.534 | 56.0 | Refractive | — |
| 3 | | −10.8510 | (ASP) | −2.698 | Plastic | 1.534 | 56.0 | Reflective | — |
| 4 | Lens 1 central area | −6.6229 | (ASP) | 2.698 | Plastic | 1.534 | 56.0 | Reflective | — |
| 5 | | −10.8510 | (ASP) | 0.086 | | | | Refractive | |
| 6 | Ape. Stop | Plano | | −0.051 | | | | Refractive | |
| 7 | Lens 2 | 83.3333 | (ASP) | 0.320 | Plastic | 1.642 | 22.5 | Refractive | −5.20 |
| 8 | | 3.2033 | (ASP) | 0.374 | | | | Refractive | |
| 9 | Lens 3 | 7.9591 | (ASP) | 0.782 | Plastic | 1.669 | 19.5 | Refractive | −68.73 |
| 10 | | 6.5175 | (ASP) | 0.085 | | | | Refractive | |
| 11 | Stop | Plano | | 0.278 | | | | Refractive | |
| 12 | Lens 4 | 14.0182 | (ASP) | 0.628 | Plastic | 1.587 | 28.3 | Refractive | 18.32 |
| 13 | | −45.4545 | (ASP) | 0.103 | | | | Refractive | |
| 14 | Lens 5 | −27.8136 | (ASP) | 0.660 | Plastic | 1.545 | 56.1 | Refractive | −22.31 |
| 15 | | 21.7756 | (ASP) | 0.316 | | | | Refractive | |
| 16 | Filter | Plano | | 0.210 | Glass | 1.517 | 64.2 | Refractive | — |
| 17 | | Plano | | 0.350 | | | | Refractive | |
| 18 | Image | Plano | | — | | | | Refractive | |

Note:
Reference wavelength is 587.6 nm (d-line).
An effective radius of the stop S1 (Surface 1) is 5.000 mm.
An effective radius of the stop S2 (Surface 11) is 1.405 mm.

TABLE 3B

Aspheric Coefficients

| Surface # | 2 | 3 | 4 | 5 |
|---|---|---|---|---|
| k = | −5.143770E+00 | −4.492620E−01 | −3.524690E+00 | −4.492620E−01 |
| A4 = | −1.775797E−04 | 3.865561E−05 | −1.479601E−04 | 3.865561E−05 |
| A6 = | −4.520292E−07 | 4.159834E−07 | 6.011788E−05 | 4.159834E−07 |
| A8 = | 1.086302E−07 | 8.159370E−08 | −5.900469E−06 | 8.159370E−08 |
| A10 = | — | −8.760070E−09 | 1.239350E−07 | −8.760070E−09 |
| A12 = | — | 8.318914E−10 | — | 8.318914E−10 |
| A14 = | — | −5.017207E−11 | — | −5.017207E−11 |
| A16 = | — | 1.842150E−12 | — | 1.842150E−12 |
| A18 = | — | −3.738468E−14 | — | −3.738468E−14 |
| A20 = | — | 3.207507E−16 | — | 3.207507E−16 |

| Surface # | 7 | 8 | 9 | 10 |
|---|---|---|---|---|
| k = | −9.900000E+01 | 1.671140E+00 | 2.437800E+01 | 3.297890E+00 |
| A4 = | 5.985343E−02 | 4.924255E−02 | −5.260625E−02 | −5.659838E−02 |
| A6 = | −2.906548E−02 | −2.147936E−02 | 3.185498E−02 | 1.799341E−02 |
| A8 = | 2.544770E−02 | −1.190065E−02 | −1.734781E−01 | −3.692830E−02 |
| A10 = | −3.595821E−02 | 1.054132E−01 | 5.261678E−01 | 5.451900E−02 |
| A12 = | 6.048449E−02 | −3.021720E−01 | −1.023925E+00 | −5.491687E−02 |
| A14 = | −7.316696E−02 | 4.941583E−01 | 1.246275E+00 | 3.441309E−02 |
| A16 = | 5.469632E−02 | −4.691666E−01 | −9.259491E−01 | −1.165117E−02 |

TABLE 3B-continued

| Aspheric Coefficients | | | | |
|---|---|---|---|---|
| A18 = | −2.251126E−02 | 2.385237E−01 | 3.837713E−01 | 1.438341E−03 |
| A20 = | 3.896649E−03 | −5.033319E−02 | −6.827251E−02 | 1.118980E−04 |
| Surface # | 12 | 13 | 14 | 15 |
| k = | 8.306510E+01 | −9.900000E+01 | −5.325770E+01 | 7.741210E+01 |
| A4 = | −5.506179E−02 | −1.339374E−01 | −1.806900E−01 | −8.589305E−02 |
| A6 = | −6.946330E−03 | 1.553520E−01 | 2.035384E−01 | 5.285294E−02 |
| A8 = | 4.441675E−02 | −1.735890E−01 | −1.973266E−01 | −4.354390E−02 |
| A10 = | −1.600032E−01 | 1.304404E−01 | 1.470581E−01 | 2.987100E−02 |
| A12 = | 2.513021E−01 | −6.182247E−02 | −7.256226E−02 | −1.505477E−02 |
| A14 = | −2.264953E−01 | 1.786914E−02 | 2.276356E−02 | 5.097039E−03 |
| A16 = | 1.193172E−01 | −2.876818E−03 | −4.371547E−03 | −1.085919E−03 |
| A18 = | −3.413077E−02 | 1.962193E−04 | 4.692846E−04 | −1.309903E−04 |
| A20 = | 4.098137E−03 | — | −2.159723E−05 | −6.751953E−06 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

| Schematic Parameters | | | |
|---|---|---|---|
| f [mm] | 13.64 | V3 | 19.5 |
| Fno | 1.68 | Sag4R1/CT4 | −0.38 |
| HFOV [deg.] | 9.7 | YT1o [mm] | 5.00 |
| DM2I/f | 0.50 | YT1i [mm] | 2.90 |
| \|f/f2\|/(\|f/f3\| + \|f/f4\| + \|f/f5\|) | 1.69 | YM1o [mm] | 4.85 |
| 10 × \|f2/f5\| | 2.33 | YM1i [mm] | 2.70 |
| (RM2 + R4)/(RM2 − R4) | 0.35 | YM2 [mm] | 2.27 |
| (R3 + R4)/(R3 − R4) | 1.08 | YT2 [mm] | 1.26 |
| (R4 + R9)/(R4 − R9) | −0.79 | $0.5 \times f/\sqrt{YT1o^2 - YT1i^2}$ | 1.68 |
| DM2M1i/DM2R4 | 0.77 | YT1o/DM2R2 | 1.85 |
| DM2R2/(CT2+ CT3 + CT4 + CT5) | 1.13 | (YT1i − YT2)/DM2R2 | 0.61 |
| T12/T34 | 0.10 | YT1i/ImgH | 1.23 |
| T45/T34 | 0.28 | YT1i/YT2 | 2.31 |
| N2 | 1.642 | YM2/YT2 | 1.81 |
| V2 + V4 | 50.8 | — | — |

4th Embodiment

Figure 7:
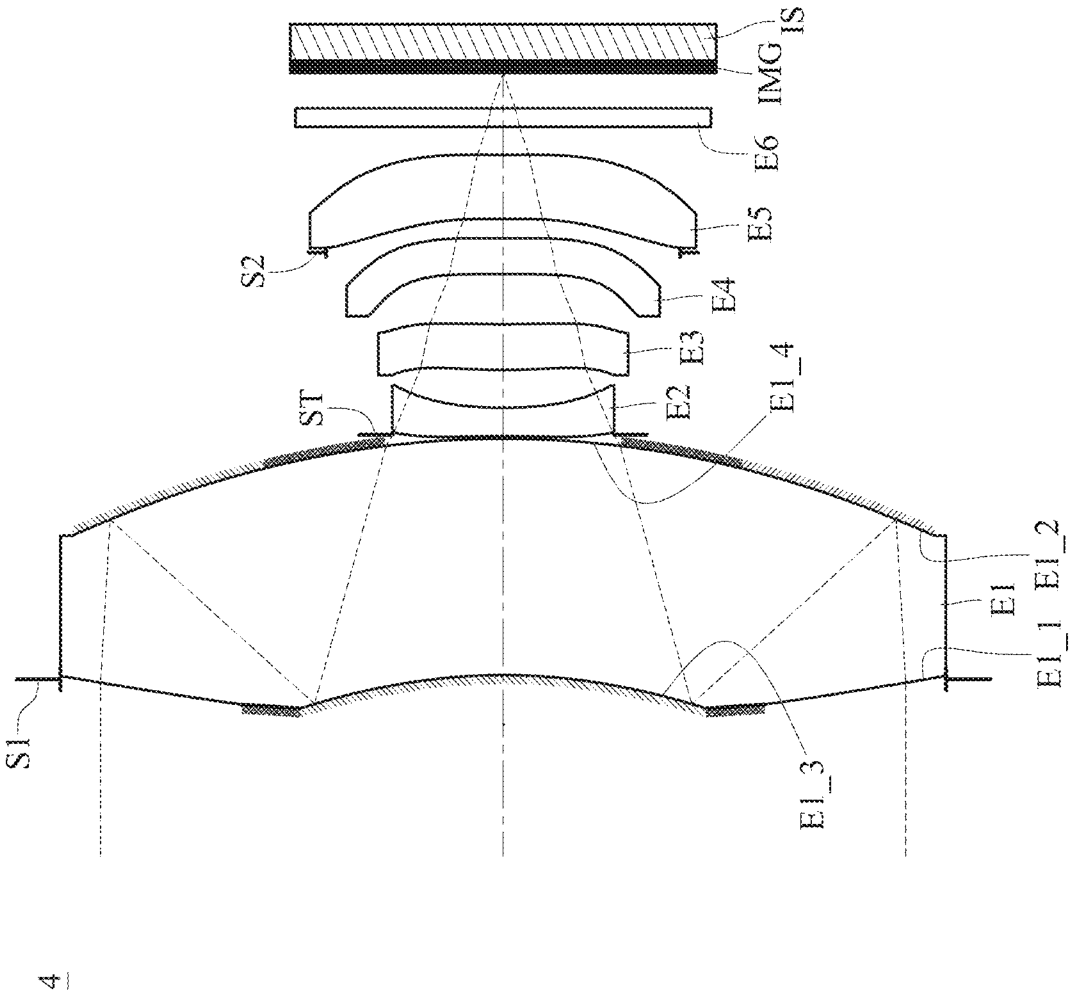
FIG. 7 is a schematic view of an image capturing unit according to the 4th embodiment of the present disclosure.
Figure 8:
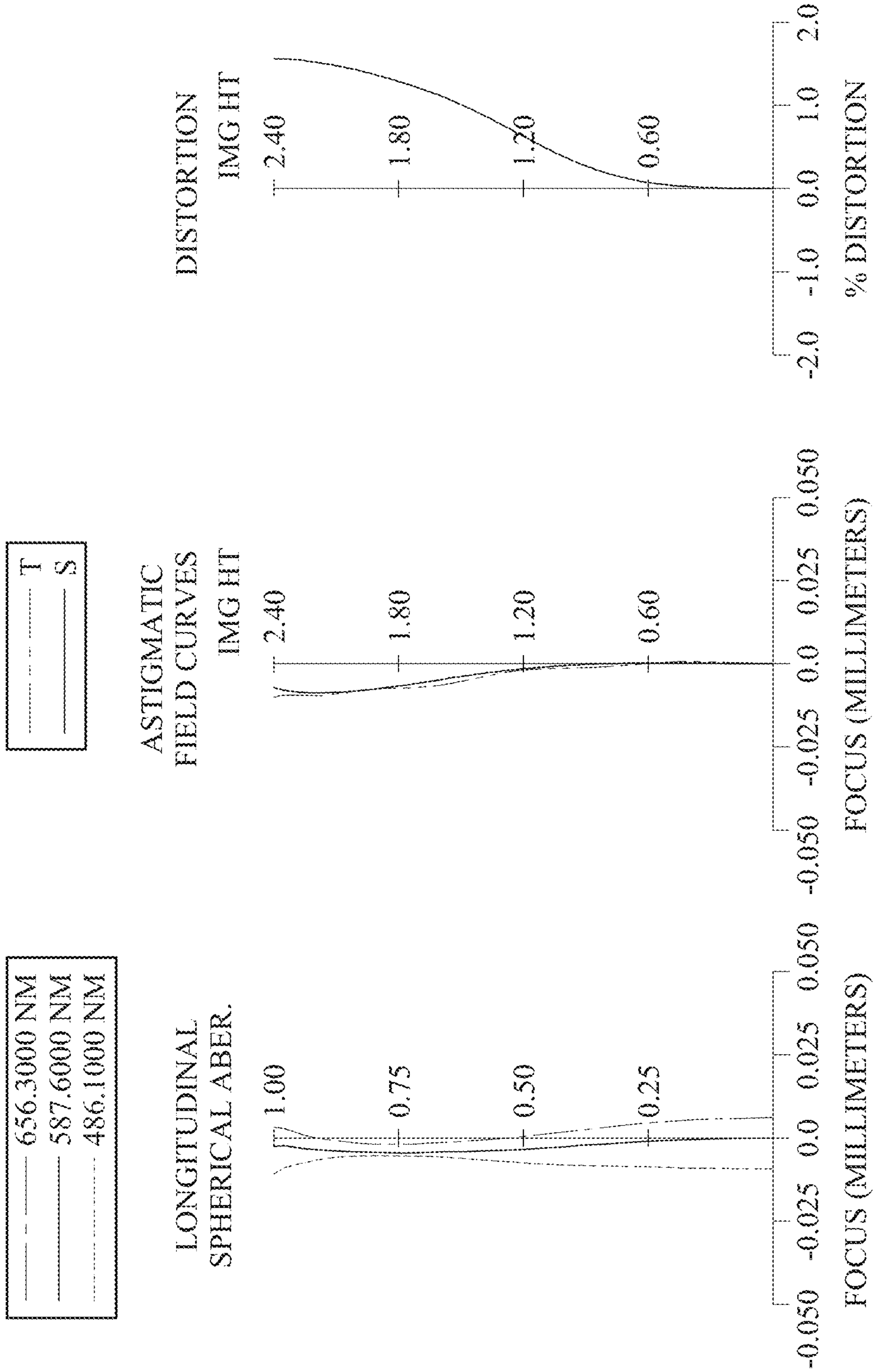
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a fourth lens element E4, a stop S2, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point and one concave critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The object-side surface of the fourth lens element E4 has one concave critical point in an off-axis region thereof. The image-side surface of the fourth lens element E4 has one convex critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 4th embodiment are shown in Table 4A and the aspheric surface data are shown in Table 4B below.

TABLE 4A

4th Embodiment
f = 14.11 mm, Fno = 1.75, HFOV = 9.5 deg.

| Surface # | | Curvature Radius | | Thickness | Material | Index | Abbe # | Refractive/ Reflective | Focal Length |
|---|---|---|---|---|---|---|---|---|---|
| 0 | Object | Plano | | Infinity | | | | Refractive | |
| 1 | Stop | Plano | | −0.512 | | | | Refractive | — |
| 2 | Lens 1 peripheral area | 17.5526 | (ASP) | 3.228 | Plastic | 1.545 | 56.1 | Refractive | — |
| 3 | | −10.8451 | (ASP) | −2.670 | Plastic | 1.545 | 56.1 | Reflective | — |
| 4 | Lens 1 central area | −6.5695 | (ASP) | 2.670 | Plastic | 1.545 | 56.1 | Reflective | |
| 5 | | −10.8451 | (ASP) | 0.043 | | | | Refractive | |
| 6 | Ape. Stop | Plano | | −0.013 | | | | Refractive | |
| 7 | Lens 2 | −10.5600 | (ASP) | 0.320 | Plastic | 1.639 | 23.5 | Refractive | −5.18 |
| 8 | | 4.8754 | (ASP) | 0.428 | | | | Refractive | |
| 9 | Lens 3 | 7.1446 | (ASP) | 0.515 | Plastic | 1.669 | 19.5 | Refractive | 30.55 |
| 10 | | 10.6676 | (ASP) | 0.565 | | | | Refractive | |
| 11 | Lens 4 | 43.9095 | (ASP) | 0.405 | Plastic | 1.669 | 19.5 | Refractive | −27.80 |
| 12 | | 13.0160 | (ASP) | −0.161 | | | | Refractive | |
| 13 | Stop | Plano | | 0.380 | | | | Refractive | |
| 14 | Lens 5 | 121.0817 | (ASP) | 0.725 | Plastic | 1.544 | 56.0 | Refractive | −82.30 |
| 15 | | 32.6176 | (ASP) | 0.316 | | | | Refractive | |
| 16 | Filter | Plano | | 0.210 | Glass | 1.517 | 64.2 | Refractive | — |
| 17 | | Plano | | 0.402 | | | | Refractive | |
| 18 | Image | Plano | | — | | | | Refractive | |

Note:
Reference wavelength is 587.6 nm (d-line).
An effective radius of the stop S1 (Surface 1) is 5.000 mm.
An effective radius of the stop S2 (Surface 13) is 2.000 mm.

TABLE 4B

Aspheric Coefficients

| Surface # | 2 | 3 | 4 | 5 |
|---|---|---|---|---|
| k = | −6.512280E+00 | −3.974470E−01 | −3.515590E+00 | −3.974470E−01 |
| A4 = | −1.639859E−04 | 4.466147E−05 | 3.338241E−05 | 4.466147E−05 |
| A6 = | −1.718265E−06 | −4.971626E−07 | 6.673205E−06 | −4.971626E−07 |
| A8 = | 8.546440E−08 | 1.852469E−07 | −3.678048E−06 | 1.852469E−07 |
| A10 = | — | −2.144024E−08 | 6.767993E−08 | −2.144024E−08 |
| A12 = | — | 1.696792E−09 | — | 1.696792E−09 |
| A14 = | — | −8.594572E−11 | — | −8.594572E−11 |
| A16 = | — | 2.694704E−12 | — | 2.694704E−12 |
| A18 = | — | −4.756527E−14 | — | −4.756527E−14 |
| A20 = | — | 3.611704E−16 | — | 3.611704E−16 |
| Surface # | 7 | 8 | 9 | 10 |
| k = | −1.294560E+01 | 5.303660E+00 | 1.268210E+01 | −2.438910E+01 |
| A4 = | 6.960877E−02 | 5.442214E−02 | −5.905826E−02 | −5.993501E−02 |
| A6 = | −3.489436E−02 | −2.039238E−02 | −1.084521E−02 | 3.657597E−02 |
| A8 = | 3.604266E−02 | −5.197797E−03 | 4.975861E−02 | −9.759895E−02 |
| A10 = | −5.174544E−02 | 4.309693E−02 | −1.482230E−01 | 1.707174E−01 |

TABLE 4B-continued

| Aspheric Coefficients | | | | |
|---|---|---|---|---|
| A12 = | 6.845983E−02 | −8.333347E−02 | 2.148088E−01 | −2.070017E−01 |
| A14 = | −6.156304E−02 | 9.391148E−02 | −1.788038E−01 | 1.634032E−01 |
| A16 = | 3.422669E−02 | −6.337868E−02 | 8.257455E−02 | −7.936701E−02 |
| A18 = | −1.058922E−02 | 2.352544E−02 | −1.866416E−02 | 2.148875E−02 |
| A20 = | 1.395728E−03 | −3.657727E−03 | 1.500198E−03 | −2.432428E−03 |
| Surface # | 11 | 12 | 14 | 15 |
| k = | −9.900000E+01 | 5.008440E+01 | 9.900000E+01 | 8.956870E+01 |
| A4 = | −1.109341E−01 | −1.911158E−01 | −1.869880E−01 | −9.538672E−02 |
| A6 = | 6.128721E−02 | 1.756956E−01 | 1.594796E−01 | 5.591659E−02 |
| A8 = | −3.362660E−02 | −1.275801E−01 | −6.543365E−02 | −2.726111E−02 |
| A10 = | −2.506939E−02 | 5.674969E−02 | 2.461685E−03 | 7.963502E−03 |
| A12 = | 4.036748E−02 | −1.676836E−02 | 9.866593E−03 | −8.983737E−04 |
| A14 = | −2.204710E−02 | 3.256118E−03 | −4.539213E−03 | −2.440920E−04 |
| A16 = | 4.622897E−03 | −3.534711E−04 | 9.513970E−04 | 1.131630E−04 |
| A18 = | 1.962928E−04 | 1.328882E−05 | −9.988704E−05 | −1.752866E−05 |
| A20 = | −1.300619E−04 | — | 4.255446E−06 | 1.012974E−06 |

In the 4th embodiment, the equation of the aspheric surface profiles of the aforementioned lens elements is the same as the equation of the 1st embodiment. Also, the definitions of these parameters shown in Table 40 are the same as those stated in the 1 st embodiment with corresponding values for the 4th embodiment, so an explanation in this regard will not be provided again.

Moreover, these parameters can be calculated from Table 4A and Table 4B3 as the following values and satisfy the following conditions:

TABLE 4C

| Schematic Parameters | | | |
|---|---|---|---|
| f [mm] | 14.11 | V3 | 19.5 |
| Fno | 1.75 | Sag4R1/CT4 | −1.17 |
| HFOV [deg.] | 9.5 | YT1o [mm] | 5.00 |
| DM2I/f | 0.48 | YT1i [mm] | 2.95 |
| \|f/f2\|/(\|f/f3\| + \|f/f4\| + \|f/f5\|) | 2.39 | YM1o [mm] | 4.87 |
| 10 × \|f2/f5\| | 0.63 | YM1i [mm] | 2.70 |
| (RM2 + R4)/(RM2 − R4) | 0.15 | YM2 [mm] | 2.30 |
| (R3 + R4)/(R3 − R4) | 0.37 | YT2 [mm] | 1.34 |
| (R4 + R9)/(R4 − R9) | −1.08 | $0.5 \times f/\sqrt{YT1o^2 - YT1i^2}$ | 1.75 |
| DM2M1i/DM2R4 | 0.77 | YT1o/DM2R2 | 1.87 |
| DM2R2/(CT2 + CT3 + CT4 + CT5) | 1.36 | (YT1i − YT2)/DM2R2 | 0.60 |
| T12/T34 | 0.05 | YT1i/ImgH | 1.23 |
| T45/T34 | 0.39 | YT1i/YT2 | 2.21 |
| N2 | 1.639 | YM2/YT2 | 1.72 |
| V2 + V4 | 43.0 | — | — |

5th Embodiment

Figure 9:
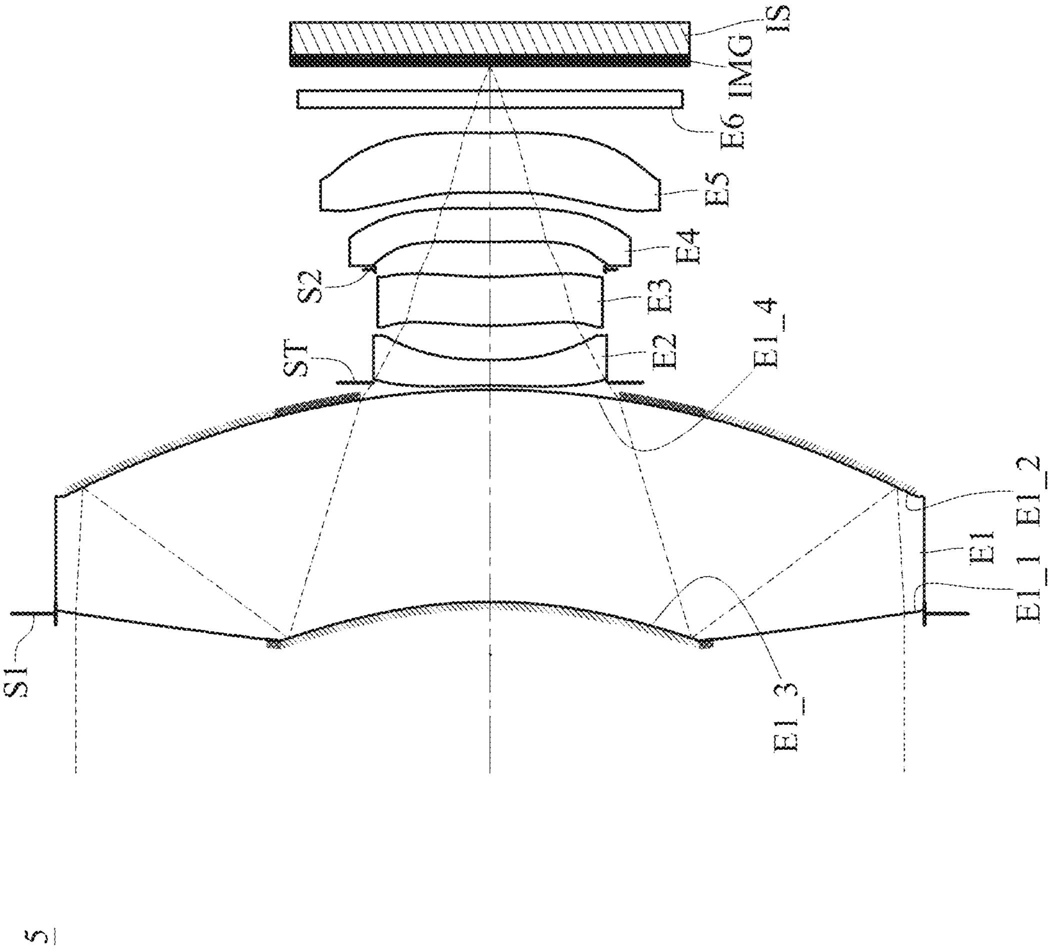
FIG. 9 is a schematic view of an image capturing unit according to the 5th embodiment of the present disclosure.
Figure 10:
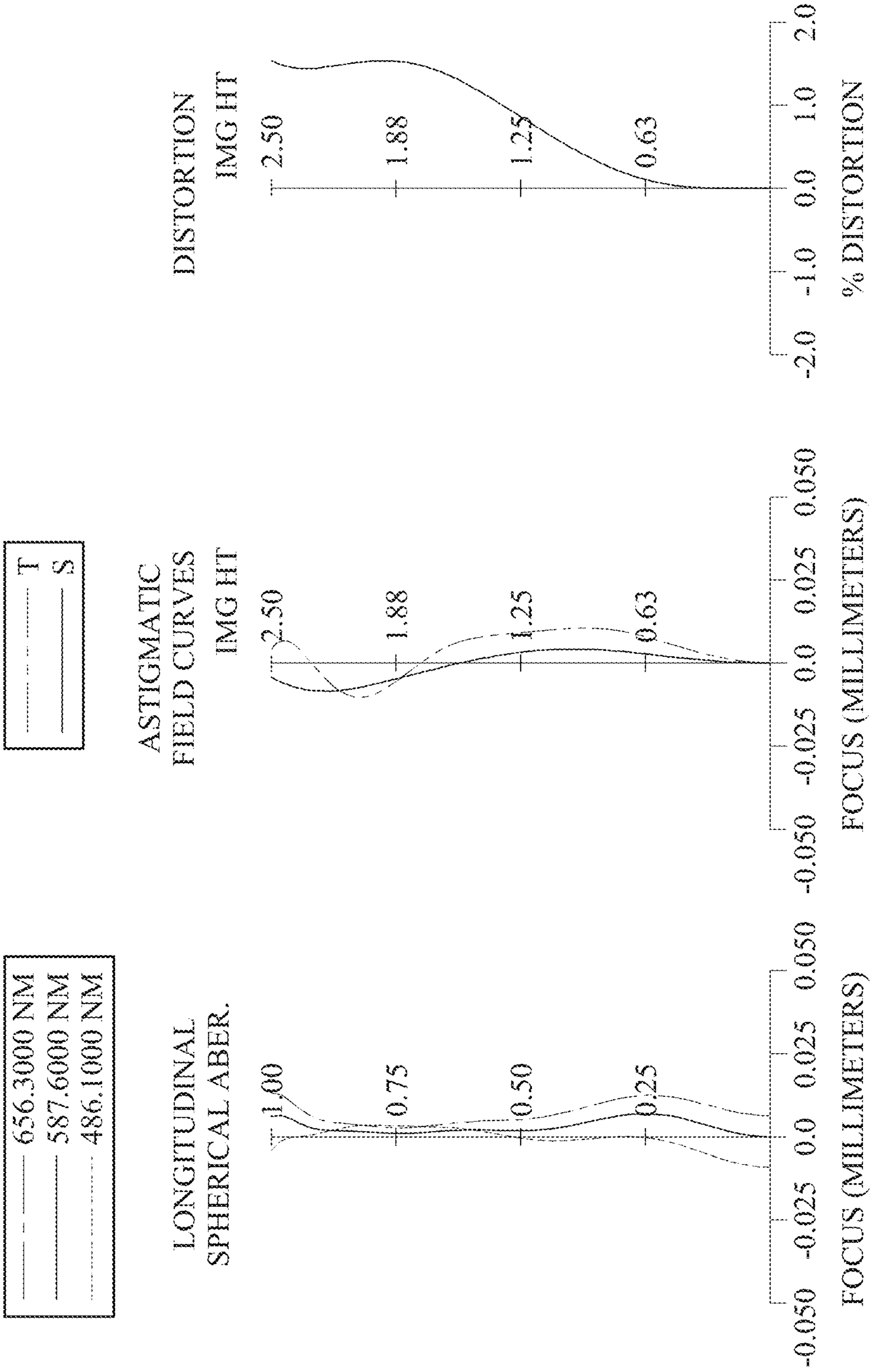
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a stop S2, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of glass material and has the first refractive surface E1_1, the first reflective surface E1_2, the second reflective surface E1_3 and the second refractive surface E1_4 being all aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point and one concave critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point. The object-side surface of the fourth lens element E4 has one concave critical point in an off-axis region thereof. The image-side surface of the fourth lens element E4 has one convex critical point in an off-axis region thereof.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 5th embodiment are shown in Table 5A and the aspheric surface data are shown in Table 5B below.

TABLE 5A

5th Embodiment
f = 13.52 mm, Fno = 1.45, HFOV = 10.3 deg.

| Surface # | | Curvature Radius | | Thickness | Material | Index | Abbe # | Refractive/ Reflective | Focal Length |
|---|---|---|---|---|---|---|---|---|---|
| 0 | Object | Plano | | Infinity | | | | Refractive | |
| 1 | Stop | Plano | | −0.512 | | | | Refractive | |
| 2 | Lens 1 peripheral area | 19.1421 | (ASP) | 3.319 | Glass | 1.583 | 59.5 | Refractive | — |
| 3 | | −10.6876 | (ASP) | −2.659 | Glass | 1.583 | 59.5 | Reflective | — |
| 4 | Lens 1 central area | −6.3844 | (ASP) | 2.659 | Glass | 1.583 | 59.5 | Reflective | — |
| 5 | | −10.6876 | (ASP) | 0.091 | | | | Refractive | |
| 6 | Ape. Stop | Plano | | −0.038 | | | | Refractive | |
| 7 | Lens 2 | −10.2812 | (ASP) | 0.320 | Plastic | 1.614 | 25.6 | Refractive | −5.23 |
| 8 | | 4.7237 | (ASP) | 0.434 | | | | Refractive | |
| 9 | Lens 3 | 5.6404 | (ASP) | 0.612 | Plastic | 1.669 | 19.5 | Refractive | 99.50 |
| 10 | | 5.8945 | (ASP) | 0.089 | | | | Refractive | |
| 11 | Stop | Plano | | 0.347 | | | | Refractive | |
| 12 | Lens 4 | 14.3361 | (ASP) | 0.419 | Plastic | 1.614 | 25.6 | Refractive | −261.97 |
| 13 | | 13.0160 | (ASP) | 0.200 | | | | Refractive | |
| 14 | Lens 5 | 108.8113 | (ASP) | 0.749 | Plastic | 1.544 | 56.0 | Refractive | −48.70 |
| 15 | | 21.2554 | (ASP) | 0.316 | | | | Refractive | |
| 16 | Filter | Plano | | 0.210 | Glass | 1.517 | 64.2 | Refractive | — |
| 17 | | Plano | | 0.314 | | | | Refractive | |
| 18 | Image | Plano | | — | | | | Refractive | |

Note:
Reference wavelength is 587.6 nm (d-line).
An effective radius of the stop S1 (Surface 1) is 5.450 mm.
An effective radius of the stop S2 (Surface 11) is 1.444 mm.

TABLE 5B

Aspheric Coefficients

| Surface # | 2 | 3 | 4 | 5 |
|---|---|---|---|---|
| k = | −8.113400E+00 | −4.000310E−01 | −3.639810E+00 | −4.000310E−01 |
| A4 = | −1.703539E−04 | 4.546928E−05 | −3.950747E−05 | 4.546928E−05 |
| A6 = | −2.671838E−06 | −1.125719E−06 | 3.064719E−05 | −1.125719E−06 |
| A8 = | 1.110878E−07 | 2.626565E−07 | −3.672173E−06 | 2.626565E−07 |
| A10 = | — | −2.727303E−08 | 6.411157E−08 | −2.727303E−08 |
| A12 = | — | 1.979709E−09 | — | 1.979709E−09 |
| A14 = | — | −9.164946E−11 | — | −9.164946E−11 |
| A16 = | — | 2.611193E−12 | — | 2.611193E−12 |
| A18 = | — | −4.160428E−14 | — | −4.160428E−14 |
| A20 = | — | 2.833257E−16 | — | 2.833257E−16 |

| Surface # | 7 | 8 | 9 | 10 |
|---|---|---|---|---|
| k = | 6.051700E+00 | 4.190540E+00 | 1.458120E+01 | 1.331560E+00 |
| A4 = | 7.128775E−02 | 6.197846E−02 | −5.778105E−02 | −5.173339E−02 |
| A6 = | −3.239187E−02 | −3.251275E−02 | 3.532556E−02 | 2.624473E−02 |

TABLE 5B-continued

| Aspheric Coefficients | | | | |
|---|---|---|---|---|
| A8 = | 4.117709E−03 | −3.236866E−03 | −1.568592E−01 | −6.685029E−02 |
| A10 = | 2.461209E−02 | 7.368239E−02 | 3.385936E−01 | 9.954439E−02 |
| A12 = | −3.461413E−02 | −1.515085E−01 | −4.681774E−01 | −1.042188E−01 |
| A14 = | 2.417594E−02 | 1.625066E−01 | 4.048017E−01 | 7.256800E−02 |
| A16 = | −9.548775E−03 | −9.858392E−02 | −2.135206E−01 | −3.149763E−02 |
| A18 = | 2.022933E−03 | 3.175887E−02 | 6.278193E−02 | 7.699847E−03 |
| A20 = | −1.780694E−04 | −4.216086E−03 | −7.878538E−03 | −7.757240E−04 |
| Surface # | 12 | 13 | 14 | 15 |
| k = | 8.487650E+01 | 4.951530E+01 | 9.900000E+01 | 5.972240E+01 |
| A4 = | −8.519003E−02 | −1.650258E−01 | −1.736866E−01 | −9.736544E−02 |
| A6 = | 2.939540E−02 | 1.419891E−01 | 1.278376E−01 | 5.904029E−02 |
| A8 = | 1.752794E−02 | −1.007468E−01 | −4.950494E−02 | −4.340651E−02 |
| A10 = | −1.036135E−01 | 5.829514E−02 | 1.876821E−02 | 2.917970E−02 |
| A12 = | 1.324695E−01 | −2.775570E−02 | −1.007002E−02 | −1.495244E−02 |
| A14 = | −9.317706E−02 | 8.603050E−03 | 4.093547E−03 | 5.122771E−03 |
| A16 = | 3.701410E−02 | −1.375145E−03 | −9.330450E−04 | −1.085223E−03 |
| A18 = | −7.475376E−03 | 7.959896E−05 | 1.085344E−04 | 1.274409E−04 |
| A20 = | 5.828771E−04 | — | −5.067622E−06 | −6.281903E−06 |

In the 5th embodiment, the equation of the aspheric surface profiles of the aforementioned lens elements is the same as the equation of the 1st embodiment. Also, the definitions of these parameters shown in Table 5C are the same as those stated in the 1 st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | | | |
|---|---|---|---|
| f [mm] | 13.52 | V3 | 19.5 |
| Fno | 1.45 | Sag4R1/CT4 | −0.71 |
| HFOV [deg.] | 10.3 | YT1o [mm] | 5.45 |
| DM2I/f | 0.50 | YT1i [mm] | 2.80 |
| \|f/f2\|/(\|f/f3\| + \|f/f4\| + \|f/f5\|) | 5.56 | YM1o [mm] | 5.35 |
| 10 × \|f2/f5\| | 1.07 | YM1i [mm] | 2.70 |
| (RM2 + R4)/(RM2 − R4) | 0.15 | YM2 [mm] | 2.63 |
| (R3 + R4)/(R3 − R4) | 0.37 | YT2 [mm] | 1.63 |
| (R4 + R9)/(R4 − R9) | −1.09 | $0.5 \times f/\sqrt{YT1o^2 - YT1i^2}$ | 1.45 |
| DM2M1i/DM2R4 | 0.76 | YT1o/DM2R2 | 2.05 |
| DM2R2/(CT2 + CT3 + CT4+ CT5) | 1.27 | (YT1i − YT2)/DM2R2 | 0.44 |
| T12/T34 | 0.12 | YT1i/ImgH | 1.17 |
| T45/T34 | 0.46 | YT1i/YT2 | 1.72 |
| N2 | 1.614 | YM2/YT2 | 1.62 |
| V2 + V4 | 51.2 | — | — |

6th Embodiment

Figure 11:
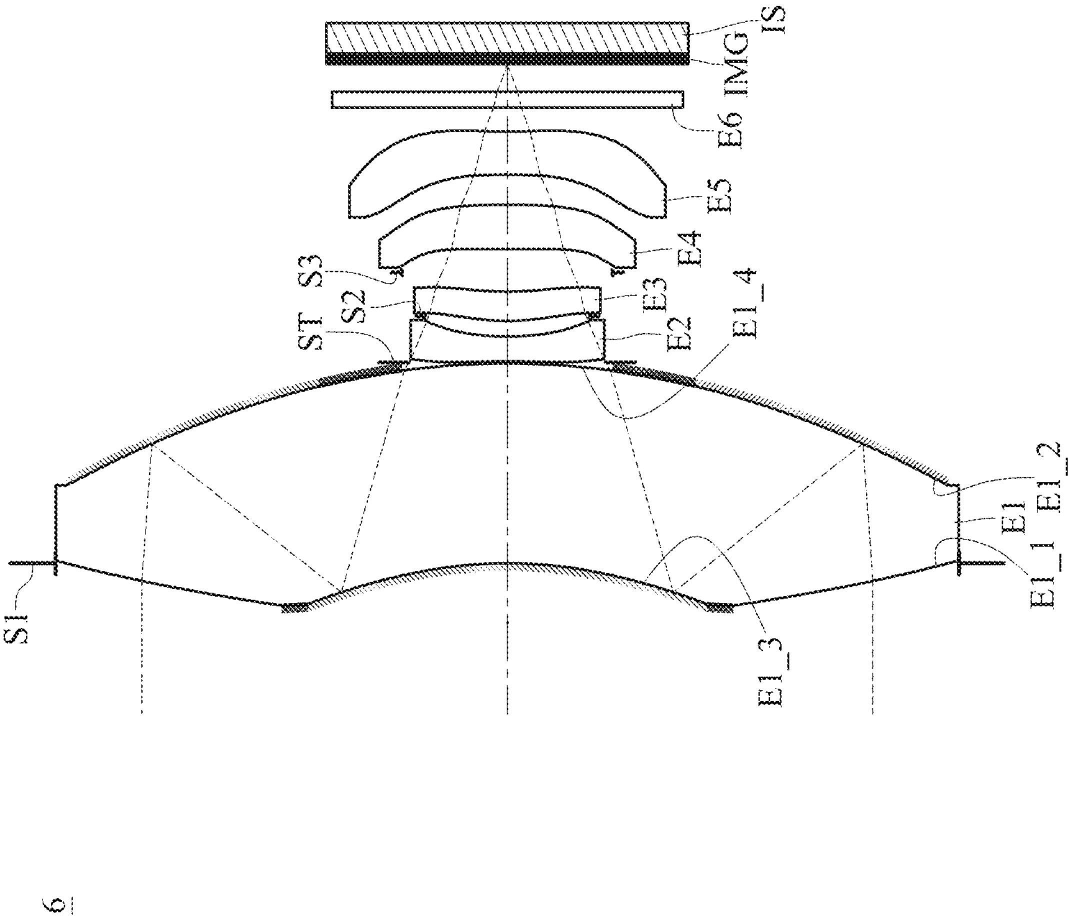
FIG. 11 is a schematic view of an image capturing unit according to the 6th embodiment of the present disclosure.
Figure 12:
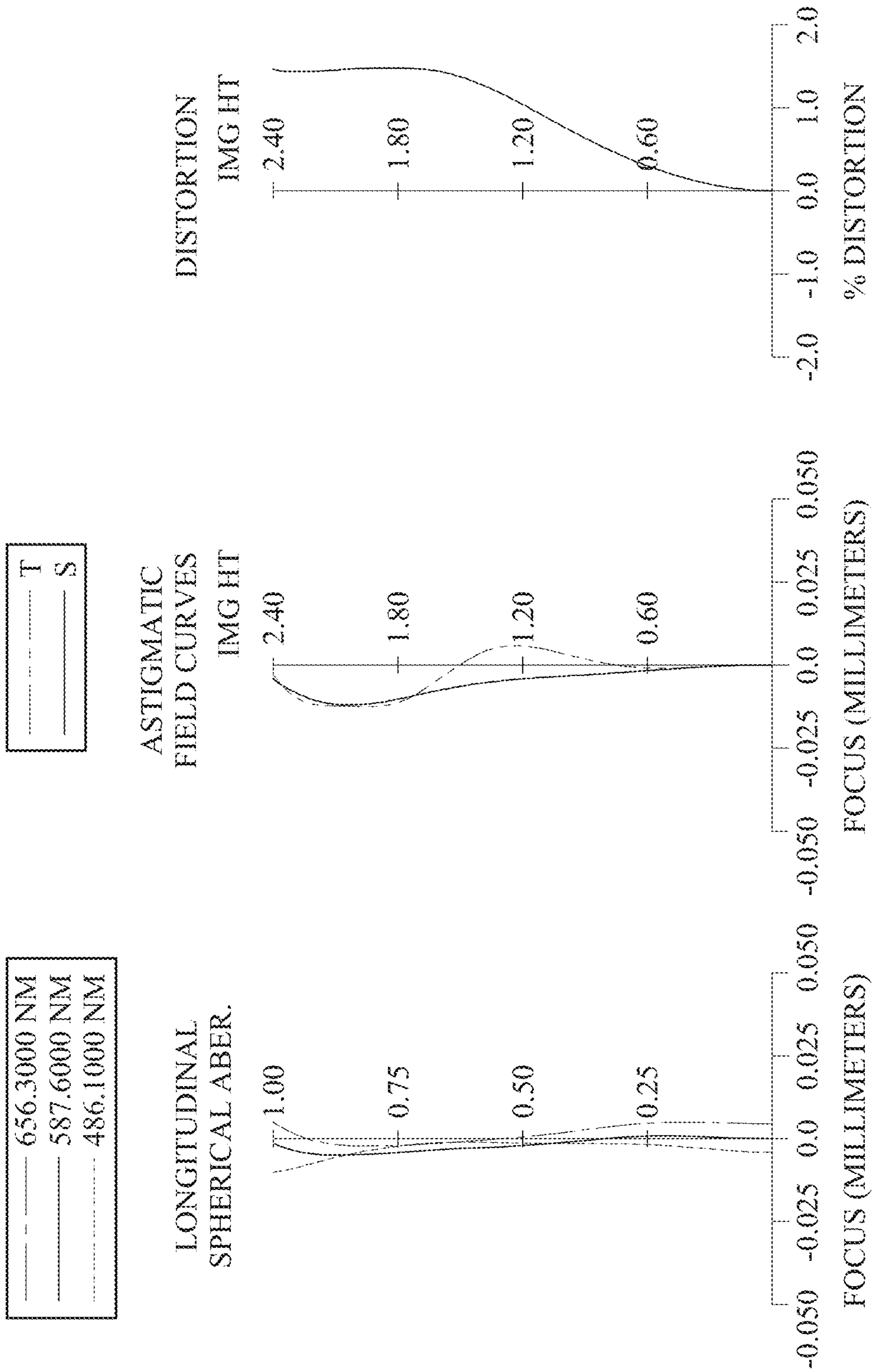
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a stop S2, a third lens element E3, a stop S3, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The image-side surface of the third lens element E3 has one convex critical point and one concave critical point in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points. The object-side surface of the fourth lens element E4 has one concave critical point in an off-axis region thereof.

The fifth lens element E5 with negative refractive power has an object-side surface being concave in a paraxial region thereof and an image-side surface being concave in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has two inflection points. The image-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 6th embodiment are shown in Table 6A and the aspheric surface data are shown in Table 6B below.

TABLE 6A

6th Embodiment
f = 14.12 mm, Fno = 1.36, HFOV = 9.5 deg.

| Surface # | | Curvature Radius | Thickness | Material | Index | Abbe # | Refractive/Reflective | Focal Length |
|---|---|---|---|---|---|---|---|---|
| 0 | Object | Plano | Infinity | | | | Refractive | |
| 1 | Stop | Plano | −0.793 | | | | Refractive | |
| 2 | Lens 1 peripheral area | 18.3532 (ASP) | 3.447 | Plastic | 1.545 | 56.1 | Refractive | — |
| 3 | | −10.3120 (ASP) | −2.654 | Plastic | 1.545 | 56.1 | Reflective | — |
| 4 | Lens 1 central area | −5.7842 (ASP) | 2.654 | Plastic | 1.545 | 56.1 | Reflective | — |
| 5 | | −10.3120 (ASP) | 0.014 | | | | Refractive | |
| 6 | Ape. Stop | Plano | 0.016 | | | | Refractive | |
| 7 | Lens 2 | −8.8690 (ASP) | 0.330 | Plastic | 1.669 | 19.5 | Refractive | −4.00 |
| 8 | | 3.8855 (ASP) | 0.269 | | | | Refractive | |
| 9 | Stop | Plano | −0.063 | | | | Refractive | |
| 10 | Lens 3 | 2.8360 (ASP) | 0.389 | Plastic | 1.669 | 19.5 | Refractive | 12.48 |
| 11 | | 4.0583 (ASP) | 0.255 | | | | Refractive | |
| 12 | Stop | Plano | 0.311 | | | | Refractive | |
| 13 | Lens 4 | 32.1258 (ASP) | 0.589 | Plastic | 1.639 | 23.5 | Refractive | 14.55 |
| 14 | | −12.9782 (ASP) | 0.399 | | | | Refractive | |
| 15 | Lens 5 | −10.7843 (ASP) | 0.574 | Plastic | 1.544 | 56.0 | Refractive | −8.29 |
| 16 | | 7.8945 (ASP) | 0.316 | | | | Refractive | |
| 17 | Filter | Plano | 0.210 | Glass | 1.517 | 64.2 | Refractive | — |
| 18 | | Plano | 0.373 | | | | Refractive | |
| 19 | Image | Plano | — | | | | Refractive | |

Note:
Reference wavelength is 587.6 nm (d-line).
An effective radius of the stop S1 (Surface 1) is 6.000 mm.
An effective radius of the stop S2 (Surface 9) is 1.100 mm.
An effective radius of the stop S3 (Surface 12) is 1.400 mm.

TABLE 6B

Aspheric Coefficients

| Surface # | 2 | 3 | 4 | 5 |
|---|---|---|---|---|
| k = | 2.056690E−01 | −5.532690E−01 | −4.922260E+00 | −5.532690E−01 |
| A4 = | −2.095942E−04 | 7.580456E−05 | −6.447821E−04 | 7.580456E−05 |
| A6 = | 4.553592E−07 | 1.796760E−07 | 5.079896E−05 | 1.796760E−07 |
| A8 = | 3.904534E−08 | 1.152866E−08 | −5.636284E−06 | 1.152866E−08 |
| A10 = | — | −6.398998E−11 | 1.424592E−07 | −6.398998E−11 |

| Surface # | 7 | 8 | 10 | 11 |
|---|---|---|---|---|
| k = | −6.688140E+01 | 3.598090E+00 | −1.983320E+00 | −1.252400E+00 |
| A4 = | 6.236019E−02 | 2.521825E−02 | −9.193867E−02 | −6.767432E−02 |
| A6 = | −2.509435E−02 | 2.380986E−02 | 6.308288E−02 | 8.565944E−04 |
| A8 = | 9.724269E−03 | −2.827863E−02 | −8.654931E−02 | 2.186149E−02 |
| A10 = | −2.394242E−03 | −6.922387E−03 | 8.894222E−02 | −5.092758E−02 |
| A12 = | 3.485783E−04 | 3.914141E−02 | −5.813794E−02 | 5.529207E−02 |
| A14 = | — | −3.378168E−02 | 1.619402E−02 | −3.122668E−02 |
| A16 = | — | 9.771405E−03 | — | 7.717954E−03 |

TABLE 6B-continued

| Aspheric Coefficients | | | | |
|---|---|---|---|---|
| Surface # | 13 | 14 | 15 | 16 |
| k = | 9.900000E+01 | 1.991220E+01 | 7.506720E+00 | 1.238480E+00 |
| A4 = | −3.622441E−02 | −4.485027E−02 | −1.134638E−01 | −1.083007E−01 |
| A6 = | −3.181676E−02 | −4.528481E−03 | 4.462901E−02 | 4.580045E−02 |
| A8 = | 5.589727E−02 | 4.288417E−02 | 7.279276E−03 | −1.829342E−02 |
| A10 = | −8.812823E−02 | −9.341189E−02 | −3.006668E−02 | 3.828804E−03 |
| A12 = | 7.409508E−02 | 9.675995E−02 | 1.977235E−02 | −2.312759E−04 |
| A14 = | −3.787648E−02 | −5.885786E−02 | −5.830566E−03 | −3.121438E−05 |
| A16 = | 1.130913E−02 | 2.136208E−02 | 8.221887E−04 | −1.546288E−06 |
| A18 = | −1.417788E−03 | −4.205370E−03 | −4.515655E−05 | 1.009793E−06 |
| A20 = | — | 3.418516E−04 | — | — |

In the 6th embodiment, the equation of the aspheric surface profiles of the aforementioned lens elements is the same as the equation of the 1st embodiment. Also, the definitions of these parameters shown in Table 60 are the same as those stated in the 1 st embodiment with corresponding values for the 6th embodiment, so an explanation in this regard will not be provided again.

Moreover, these parameters can be calculated from Table 6A and Table 6B3 as the following values and satisfy the following conditions:

TABLE 6C

| Schematic Parameters | | | |
|---|---|---|---|
| f [mm] | 14.12 | V3 | 19.5 |
| Fno | 1.36 | Sag4R1/CT4 | −0.42 |
| HFOV [deg.] | 9.5 | YT1o [mm] | 6.00 |
| DM2I/f | 0.47 | YT1i [mm] | 3.00 |
| \|f/f2\|/(\|f/f3\| + \|f/f4\| + \|f/f5\|) | 0.93 | YM1o [mm] | 5.86 |
| 10 × \|f2/f5\| | 4.83 | YM1i [mm] | 2.50 |
| (RM2 + R4)/(RM2 − R4) | 0.20 | YM2 [mm] | 2.65 |
| (R3 + R4)/(R3 − R4) | 0.39 | YT2 [mm] | 1.40 |
| (R4 + R9)/(R4 − R9) | −0.47 | $0.5 \times f/\sqrt{YT1o^2 - YT1i^2}$ | 1.36 |
| DM2M1i/DM2R4 | 0.78 | YT1o/DM2R2 | 2.26 |
| DM2R2/(CT2 + CT3 + CT4 + CT5) | 1.41 | (YT1i − YT2)/DM2R2 | 0.60 |
| T12/T34 | 0.05 | YT1i/ImgH | 1.25 |
| T45/T34 | 0.70 | YT1i/YT2 | 2.14 |
| N2 | 1.669 | YM2/YT2 | 1.89 |
| V2 + V4 | 43.0 | — | — |

7th Embodiment

Figure 13:
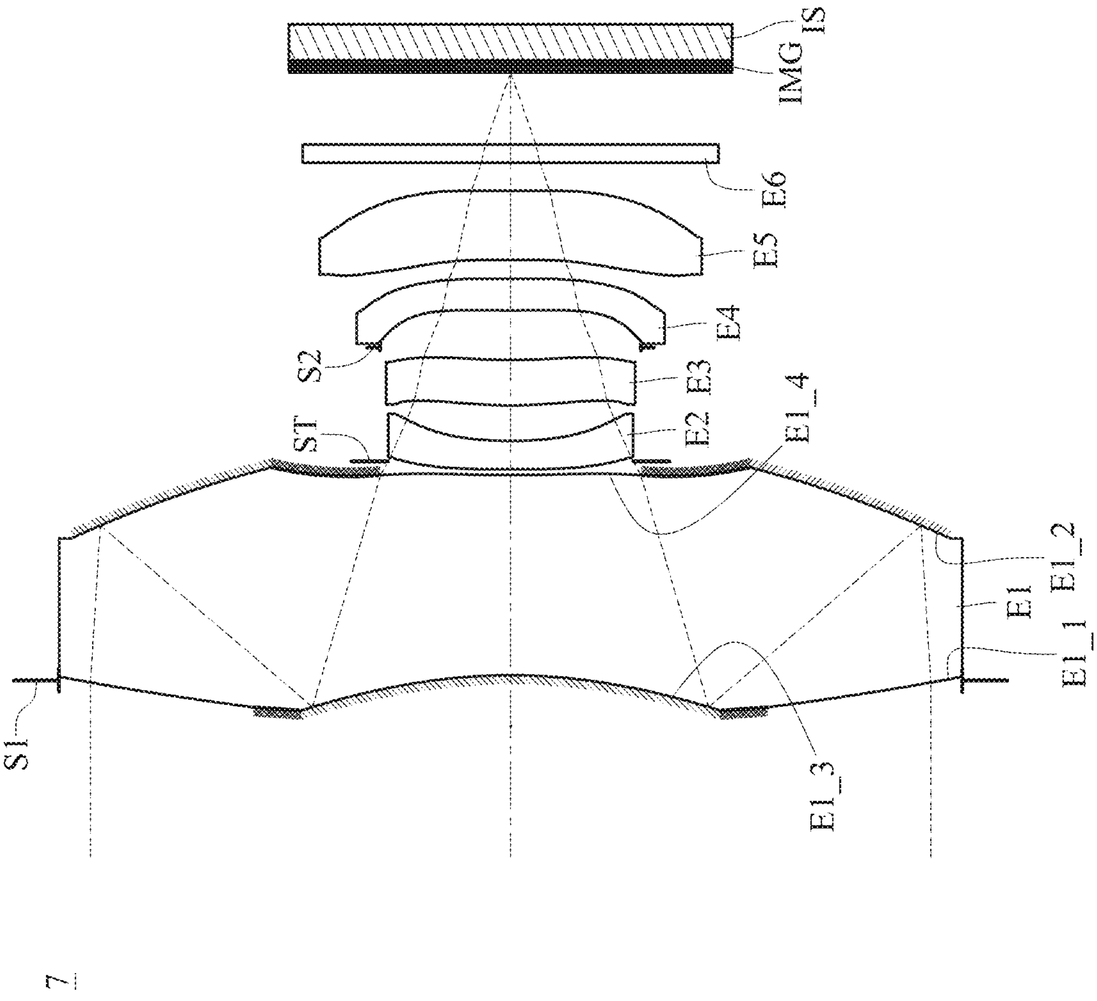
FIG. 13 is a schematic view of an image capturing unit according to the 7th embodiment of the present disclosure.
Figure 14:
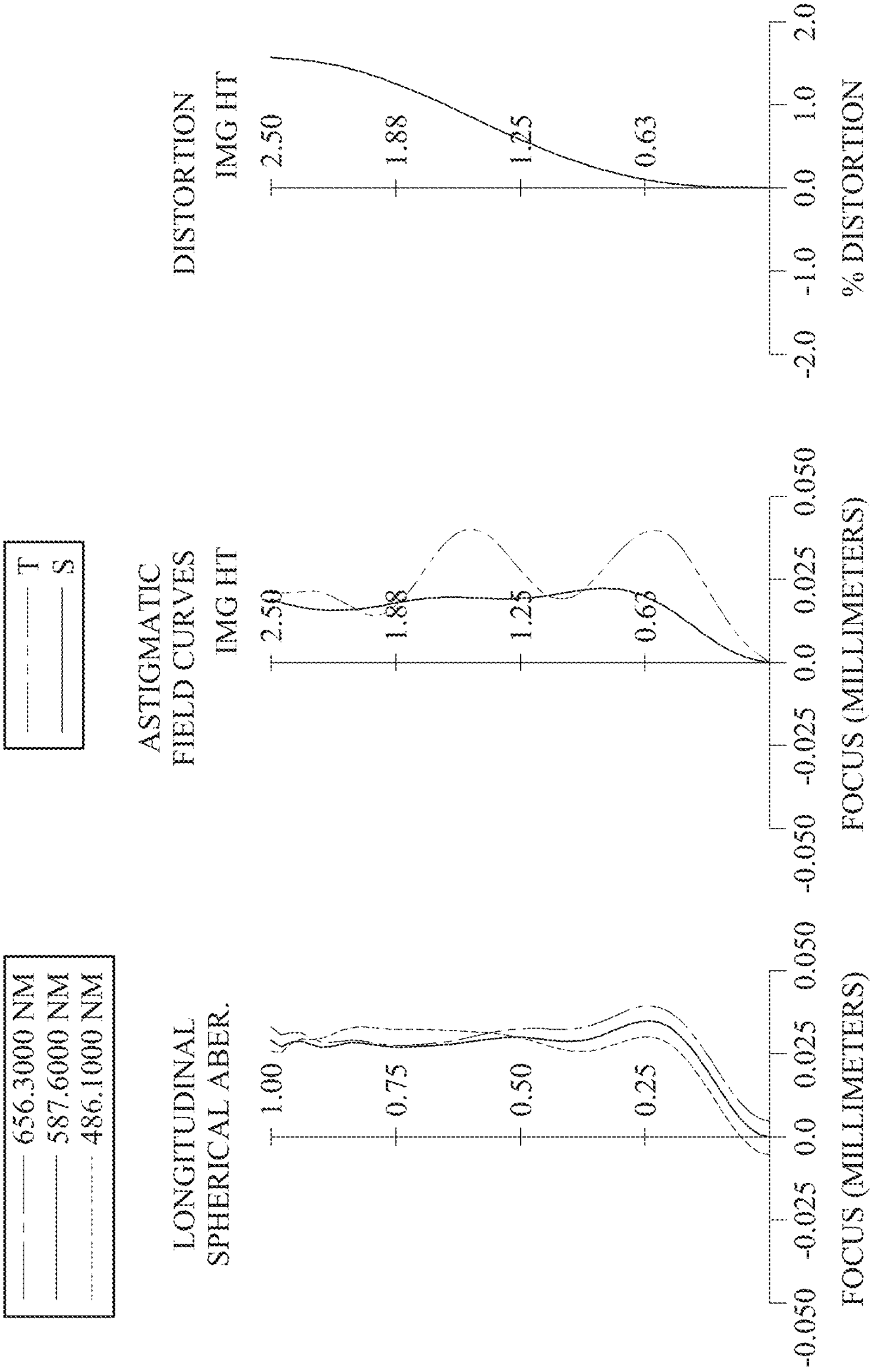
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a stop S2, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is concave in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The image-side surface of the second lens element E2 has one inflection point.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with negative refractive power has an object-side surface being convex in a paraxial region thereof and an image-side surface being concave in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has one inflection point. The object-side surface of the fourth lens element E4 has one concave critical point in an off-axis region thereof. The image-side surface of the fourth lens element E4 has one convex critical point in an off-axis region thereof.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has two inflection points. The object-side surface of the fifth lens element E5 has one convex critical point and one concave critical point in an off-axis region thereof. The image-side surface of the fifth lens element E5 has one convex critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 7th embodiment are shown in Table 7A and the aspheric surface data are shown in Table 71B below.

TABLE 7A

| 7th Embodiment<br>f = 14.24 mm, Fno = 1.70, HFOV = 9.7 deg. | | | | | | | | | |
|---|---|---|---|---|---|---|---|---|---|
| Surface # | | Curvature Radius | | Thickness | Material | Index | Abbe # | Refractive/ Reflective | Focal Length |
| 0 | Object | Plano | | Infinity | | | | Refractive | |
| 1 | Stop | Plano | | −0.512 | | | | Refractive | |
| 2 | Lens 1 peripheral area | 18.3187 | (ASP) | 3.260 | Plastic | 1.545 | 56.1 | Refractive | — |
| 3 | | −10.7380 | (ASP) | −2.689 | Plastic | 1.545 | 56.1 | Reflective | — |
| 4 | Lens 1 central area | −6.4708 | (ASP) | 2.262 | Plastic | 1.545 | 56.1 | Reflective | — |
| 5 | | 19.2339 | (ASP) | 0.156 | | | | Refractive | |
| 6 | Ape. Stop | Plano | | −0.091 | | | | Refractive | |
| 7 | Lens 2 | 128.3017 | (ASP) | 0.320 | Plastic | 1.686 | 18.4 | Refractive | −7.18 |
| 8 | | 4.7415 | (ASP) | 0.402 | | | | Refractive | |
| 9 | Lens 3 | 5.0719 | (ASP) | 0.513 | Plastic | 1.669 | 19.5 | Refractive | 28.05 |
| 10 | | 6.6687 | (ASP) | 0.141 | | | | Refractive | |
| 11 | Stop | Plano | | 0.418 | | | | Refractive | |
| 12 | Lens 4 | 15.2955 | (ASP) | 0.355 | Plastic | 1.587 | 28.3 | Refractive | −754.62 |
| 13 | | 14.6582 | (ASP) | 0.213 | | | | Refractive | |
| 14 | Lens 5 | 21.0903 | (ASP) | 0.782 | Plastic | 1.544 | 56.0 | Refractive | 2030.95 |
| 15 | | 21.2198 | (ASP) | 0.316 | | | | Refractive | |
| 16 | Filter | Plano | | 0.210 | Glass | 1.517 | 64.2 | Refractive | — |
| 17 | | Plano | | 0.812 | | | | Refractive | |
| 18 | Image | Plano | | — | | | | Refractive | |

Note:
Reference wavelength is 587.6 nm (d-line).
An effective radius of the stop S1 (Surface 1) is 5.100 mm.
An effective radius of the stop S2 (Surface 11) is 1.472 mm.

TABLE 7B

| Aspheric Coefficients | | | | |
|---|---|---|---|---|
| Surface # | 2 | 3 | 4 | 5 |
| k = | −6.549880E+00 | −4.521440E−01 | −3.691690E+00 | −1.579780E+01 |
| A4 = | −1.919186E−04 | 5.668060E−05 | −8.039490E−05 | 1.886010E−02 |
| A6 = | −7.119912E−07 | −1.237188E−05 | 5.460883E−05 | −1.023567E−01 |
| A8 = | 1.152255E−07 | 4.697026E−06 | −5.932263E−06 | 2.613733E−01 |
| A10 = | — | −1.039836E−06 | 1.358033E−07 | −7.068512E−01 |
| A12 = | — | 1.535172E−07 | — | 1.469559E+00 |
| A14 = | — | −1.557039E−08 | — | −2.054212E+00 |
| A16 = | — | 1.101846E−09 | — | 1.924677E+00 |
| A18 = | — | −5.434401E−11 | — | −1.218148E+00 |
| A20 = | — | 1.831374E−12 | — | 5.154241E−01 |
| A22 = | — | −4.019877E−14 | — | −1.399254E−01 |
| A24 = | — | 5.178356E−16 | — | 2.205843E−02 |
| A26 = | — | −2.969265E−18 | — | −1.536100E−03 |
| Surface # | 7 | 8 | 9 | 10 |
| k = | −9.900000E+01 | 6.389040E+00 | 1.306420E+01 | 2.402130E+00 |
| A4 = | 9.031149E−02 | 7.233362E−02 | −6.710752E−02 | −5.502485E−02 |
| A6 = | −8.378719E−02 | −7.796497E−02 | 6.756436E−02 | 1.048745E−02 |
| A8 = | 1.008934E−02 | 1.413038E−01 | −3.189280E−01 | −9.461057E−03 |
| A10 = | 1.326504E−01 | −2.217670E−01 | 8.019365E−01 | −2.382799E−02 |
| A12 = | −2.029815E−01 | 2.651694E−01 | −1.235371E+00 | 7.811095E−02 |

TABLE 7B-continued

| Aspheric Coefficients | | | | |
|---|---|---|---|---|
| A14 = | 1.488852E−01 | −2.172564E−01 | 1.181507E+00 | −9.484668E−02 |
| A16 = | −6.089502E−02 | 1.108516E−01 | −6.857146E−01 | 6.024402E−02 |
| A18 = | 1.328577E−02 | −3.145267E−02 | 2.210117E−01 | −1.991828E−02 |
| A20 = | −1.203190E−03 | 3.683703E−03 | −3.051720E−02 | 2.719004E−03 |
| Surface # | 12 | 13 | 14 | 15 |
| k = | 8.128180E+01 | 5.159740E+01 | 8.195030E+01 | 7.985350E+01 |
| A4 = | −9.816664E−02 | −1.771764E−01 | −1.847209E−01 | −8.326780E−02 |
| A6 = | 8.265340E−02 | 1.673392E−01 | 1.550298E−01 | 3.378161E−02 |
| A8 = | −1.572155E−01 | −1.194541E−01 | −9.091699E−02 | −1.015881E−02 |
| A10 = | 2.265126E−01 | 5.741526E−02 | 5.636267E−02 | −6.306549E−05 |
| A12 = | −2.522508E−01 | −1.644732E−02 | −3.057433E−02 | 1.586925E−03 |
| A14 = | 1.855756E−01 | 1.006616E−03 | 1.084276E−02 | −6.908491E−04 |
| A16 = | −8.313268E−02 | 6.614113E−04 | −2.250525E−03 | 1.383308E−04 |
| A18 = | 2.023446E−02 | −1.156153E−04 | 2.493117E−04 | −1.334265E−05 |
| A20 = | −2.015931E−03 | — | −1.142482E−05 | 4.975096E−07 |

In the 7th embodiment, the equation of the aspheric surface profiles of the aforementioned lens elements is the same as the equation of the 1st embodiment. Also, the definitions of these parameters shown in Table 70 are the same as those stated in the 1 st embodiment with corresponding values for the 7th embodiment, so an explanation in this regard will not be provided again.

Moreover, these parameters can be calculated from Table 7A and Table 71B as the following values and satisfy the following conditions:

TABLE 7C

| Schematic Parameters | | | |
|---|---|---|---|
| f [mm] | 14.24 | V3 | 19.5 |
| Fno | 1.70 | Sag4R1/CT4 | −1.06 |
| HFOV [deg.] | 9.7 | YT1o [mm] | 5.10 |
| DM2I/f | 0.48 | YT1i [mm] | 2.90 |
| \|f/f2\|/(\|f/f3\| + \|f/f4\| + \|f/f5\|) | 3.72 | YM1o [mm] | 4.96 |
| 10 × \|f2/f5\| | 0.04 | YM1i [mm] | 2.70 |
| (RM2 + R4)/(RM2 − R4) | 0.15 | YM2 [mm] | 2.37 |
| (R3 + R4)/(R3 − R4) | 1.08 | YT2 [mm] | 1.48 |
| (R4 + R9)/(R4 − R9) | −1.58 | $0.5 \times f/\sqrt{YT1o^2 - YT1i^2}$ | 1.70 |
| DM2M1i/DM2R4 | 0.89 | YT1o/DM2R2 | 2.25 |
| DM2R2/(CT2 + CT3 + CT4 + CT5) | 1.15 | (YT1i − YT2)/DM2R2 | 0.63 |
| T12/T34 | 0.12 | YT1i/ImgH | 1.16 |
| T45/T34 | 0.38 | YT1i/YT2 | 1.96 |
| N2 | 1.686 | YM2/YT2 | 1.60 |
| V2 + V4 | 46.7 | — | — |

8th Embodiment

Figure 15:
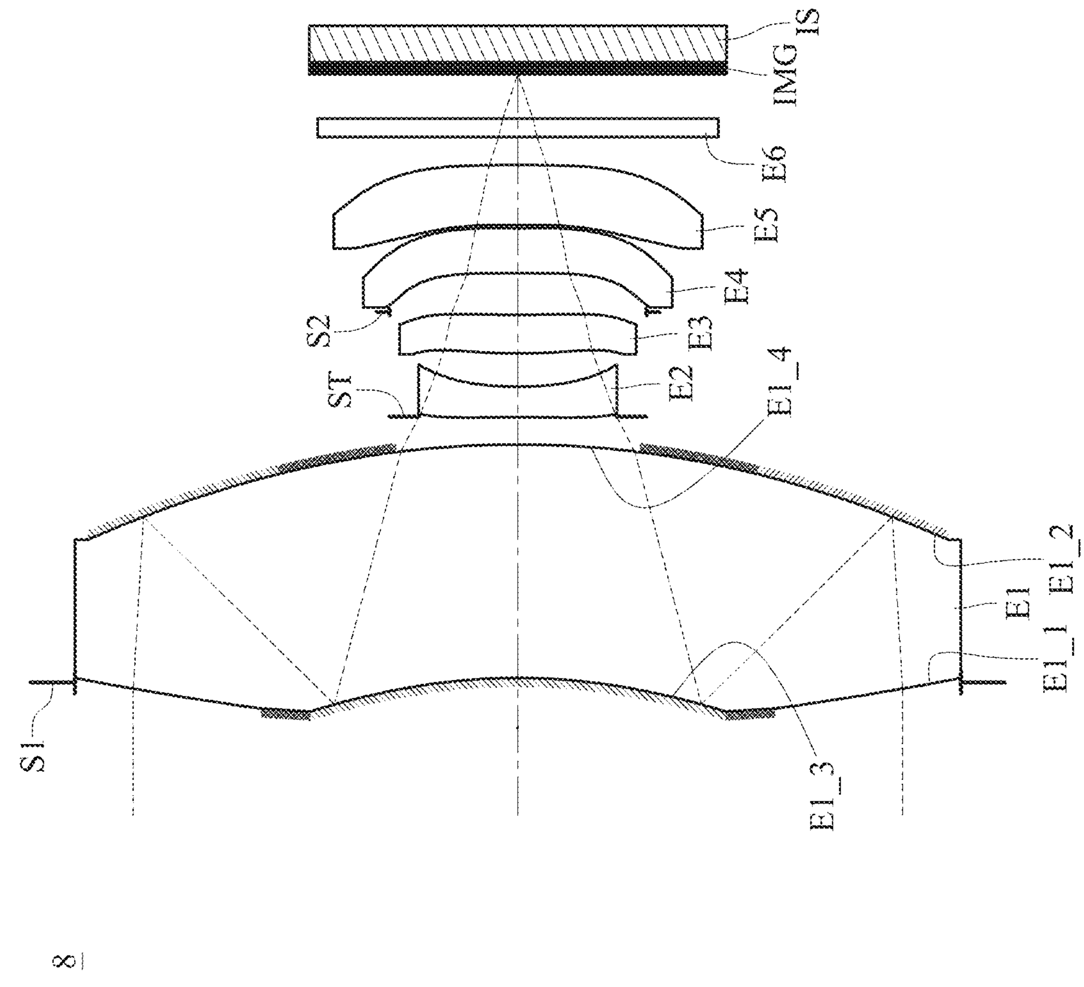
FIG. 15 is a schematic view of an image capturing unit according to the 8th embodiment of the present disclosure.
Figure 16:
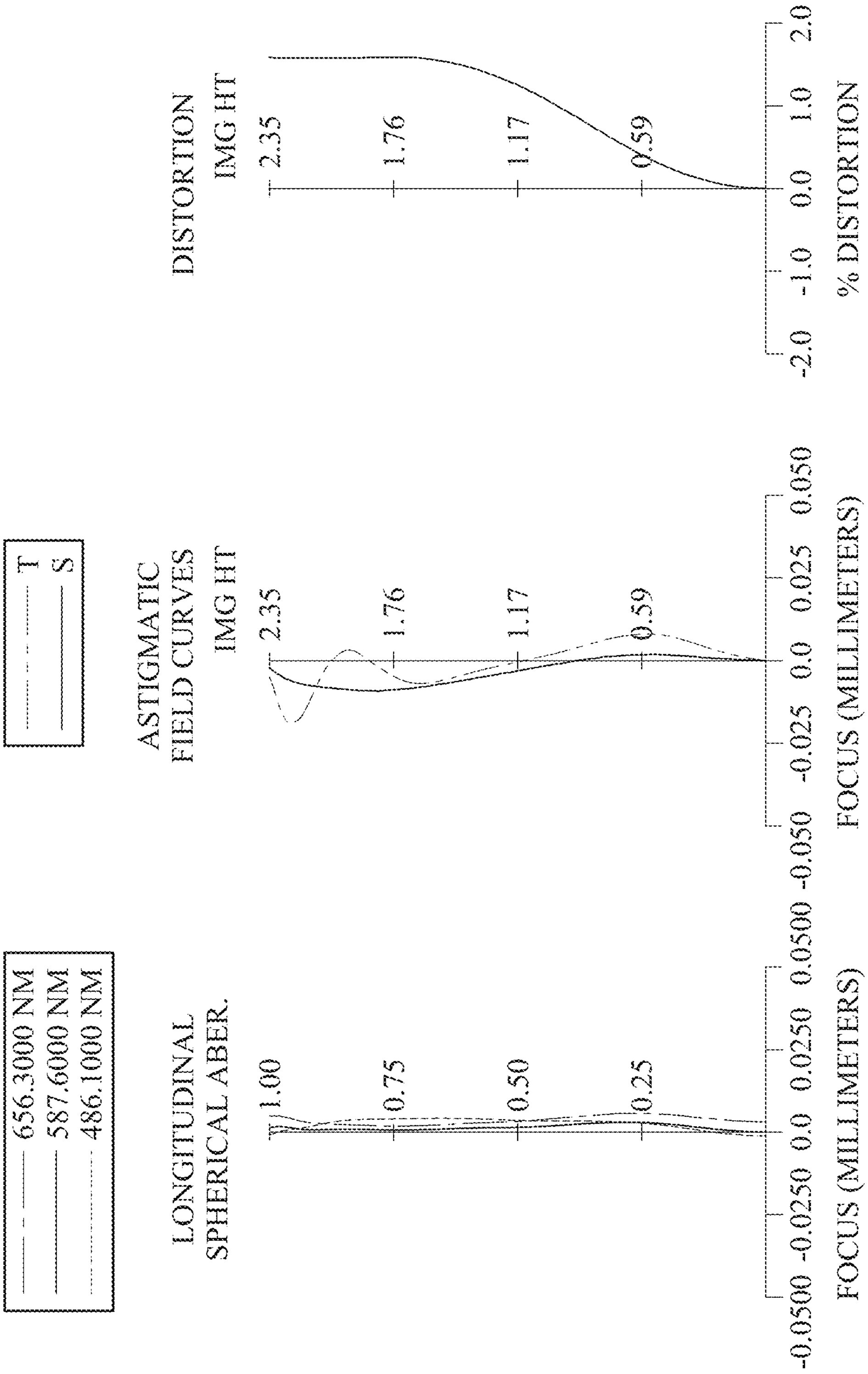
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit 8 includes the photography optical lens assembly (its reference numeral is omitted) of the present disclosure and an image sensor IS. The photography optical lens assembly includes, in order from an object side to an image side along a central axis, a stop S1, a first lens element E1, an aperture stop ST, a second lens element E2, a third lens element E3, a stop S2, a fourth lens element E4, a fifth lens element E5, a filter E6 and an image surface IMG. The photography optical lens assembly includes five lens elements (E1, E2, E3, E4 and E5) with no additional lens element disposed between each of the adjacent five lens elements.

The first lens element E1 has a first refractive surface E1_1 facing toward the object side and being located in a peripheral area of an object-side surface (its reference numeral is omitted) of the first lens element E1, a first reflective surface E1_2 facing toward the object side and being located in a peripheral area of an image-side surface (its reference numeral is omitted) of the first lens element E1, a second reflective surface E1_3 facing toward the image side and being located in a central area of the object-side surface of the first lens element E1 and a second refractive surface E1_4 facing toward the image side and being located in a central area of the image-side surface of the first lens element E1. The second refractive surface E1_4 is convex in a paraxial region thereof. The first lens element E1 is made of plastic material and has the first refractive surface E1_1, the first reflective surface E1_2, the second reflective surface E1_3 and the second refractive surface E1_4 being all aspheric.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has one inflection point. The object-side surface of the second lens element E2 has one convex critical point in an off-axis region thereof.

The third lens element E3 with positive refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one concave critical point in an off-axis region thereof. The image-side surface of the third lens element E3 has one convex critical point in an off-axis region thereof.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has two inflection points. The image-side surface of the fourth lens element E4 has one convex critical point in an off-axis region thereof.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has one inflection point. The object-side surface of the fifth lens element E5 has one convex critical point and one concave critical point in an off-axis region thereof.

The filter E6 is made of glass material and located between the fifth lens element E5 and the image surface IMG, and will not affect the focal length of the photography optical lens assembly. The image sensor IS is disposed on or near the image surface IMG of the photography optical lens assembly.

The detailed optical data of the 8th embodiment are shown in Table 8A and the aspheric surface data are shown in Table 8B below.

TABLE 8A

| 8th Embodiment<br>f = 13.46 mm, Fno = 1.69, HFOV = 9.7 deg. | | | | | | | | |
|---|---|---|---|---|---|---|---|---|
| Surface # | | Curvature Radius | Thickness | Material | Index | Abbe # | Refractive/Reflective | Focal Length |
| 0 | Object | Plano | Infinity | | | | Refractive | |
| 1 | Stop | Plano | −0.512 | | | | Refractive | |
| 2 | Lens 1 peripheral area | 17.7589 (ASP) | 3.199 | Plastic | 1.534 | 56.0 | Refractive | — |
| 3 | | −10.9308 (ASP) | −2.637 | Plastic | 1.534 | 56.0 | Reflective | — |
| 4 | Lens 1 central area | −6.7954 (ASP) | 2.637 | Plastic | 1.534 | 56.0 | Reflective | — |
| 5 | | −10.9308 (ASP) | 0.314 | | | | Refractive | |
| 6 | Ape. Stop | Plano | −0.006 | | | | Refractive | |
| 7 | Lens 2 | −13.6226 (ASP) | 0.345 | Plastic | 1.669 | 19.5 | Refractive | −4.60 |
| 8 | | 4.0161 (ASP) | 0.375 | | | | Refractive | |
| 9 | Lens 3 | 5.8804 (ASP) | 0.436 | Plastic | 1.660 | 20.4 | Refractive | 15.75 |
| 10 | | 13.1406 (ASP) | 0.031 | | | | Refractive | |
| 11 | Stop | Plano | 0.440 | | | | Refractive | |
| 12 | Lens 4 | −450.2165 (ASP) | 0.506 | Plastic | 1.669 | 19.5 | Refractive | −18.42 |
| 13 | | 12.6734 (ASP) | 0.036 | | | | Refractive | |
| 14 | Lens 5 | 24.8364 (ASP) | 0.679 | Plastic | 1.544 | 56.0 | Refractive | 26.49 |
| 15 | | −34.0171 (ASP) | 0.316 | | | | Refractive | |
| 16 | Filter | Plano | 0.210 | Glass | 1.517 | 64.2 | Refractive | — |
| 17 | | Plano | 0.502 | | | | Refractive | |
| 18 | Image | Plano | — | | | | Refractive | |

Note:
Reference wavelength is 587.6 nm (d-line).
An effective radius of the stop S1 (Surface 1) is 5.000 mm.
An effective radius of the stop S2 (Surface 11) is 1.451 mm.

TABLE 8B

| Aspheric Coefficients | | | | |
|---|---|---|---|---|
| Surface # | 2 | 3 | 4 | 5 |
| k = | −5.885480E+00 | −4.305010E−01 | −3.544010E+00 | −4.305010E−01 |
| A4 = | −1.834770E−04 | 4.176248E−05 | −2.674177E−06 | 4.176248E−05 |
| A6 = | −1.230047E−09 | −3.858049E−07 | 2.222527E−05 | −3.858049E−07 |
| A8 = | 7.446624E−08 | 2.994187E−07 | −5.113097E−06 | 2.994187E−07 |
| A10 = | — | −4.166456E−08 | 1.497875E−07 | −4.166456E−08 |
| A12 = | — | 3.636062E−09 | — | 3.636062E−09 |
| A14 = | — | −1.969021E−10 | — | −1.969021E−10 |
| A16 = | — | 6.448452E−12 | — | 6.448452E−12 |
| A18 = | — | −1.167732E−13 | — | −1.167732E−13 |
| A20 = | — | 8.962057E−16 | — | 8.962057E−16 |
| Surface # | 7 | 8 | 9 | 10 |
| k = | −4.329930E+01 | 6.068080E+00 | 1.086020E+01 | −1.372850E+01 |
| A4 = | 6.309141E−02 | 4.905097E−02 | −4.864470E−02 | −4.473019E−02 |
| A6 = | 1.642845E−02 | 4.647659E−02 | −1.864154E−02 | −1.974561E−02 |
| A8 = | −1.814191E−01 | −3.712193E−01 | 8.554096E−02 | 1.423148E−01 |
| A10 = | 5.102474E−01 | 1.235689E+00 | −2.560513E−01 | −3.914934E−01 |

TABLE 8B-continued

| Aspheric Coefficients | | | | |
|---|---|---|---|---|
| A12 = | −8.313508E−01 | −2.481909E+00 | 3.921506E−01 | 5.733127E−01 |
| A14 = | 8.392001E−01 | 3.103437E+00 | −3.689401E−01 | −5.134022E−01 |
| A16 = | −5.136306E−01 | −2.353970E+00 | 2.065554E−01 | 2.773756E−01 |
| A18 = | 1.744450E−01 | 9.910740E−01 | −6.299907E−02 | −8.278550E−02 |
| A20 = | −2.520390E−02 | −1.775273E−01 | 8.189982E−03 | 1.057014E−02 |
| Surface # | 12 | 13 | 14 | 15 |
| k = | 9.900000E+01 | 4.984740E+01 | 8.479000E+01 | −9.900000E+01 |
| A4 = | −8.625804E−02 | −2.605022E−01 | −2.586557E−01 | −3.394411E−02 |
| A6 = | 2.119629E−02 | 3.283987E−01 | 3.777090E−01 | 1.816316E−02 |
| A8 = | 7.062077E−02 | −3.212656E−01 | −3.846988E−01 | −3.092395E−02 |
| A10 = | −2.279128E−01 | 1.930690E−01 | 2.523883E−01 | 2.984413E−02 |
| A12 = | 2.943233E−01 | −6.851509E−02 | −1.019484E−01 | −1.766729E−02 |
| A14 = | −2.149018E−01 | 1.283174E−02 | 2.466863E−02 | 6.505570E−03 |
| A16 = | 8.816199E−02 | −9.011408E−04 | −3.372425E−03 | −1.434543E−03 |
| A18 = | −1.842319E−02 | −1.821373E−05 | 2.243112E−04 | 1.715346E−04 |
| A20 = | 1.505934E−03 | — | −4.510814E−06 | −8.472263E−06 |

In the 8th embodiment, the equation of the aspheric surface profiles of the aforementioned lens elements is the same as the equation of the 1st embodiment. Also, the definitions of these parameters shown in Table 80 are the same as those stated in the 1 st embodiment with corresponding values for the 8th embodiment, so an explanation in this regard will not be provided again.

Moreover, these parameters can be calculated from Table 8A and Table 8B3 as the following values and satisfy the following conditions:

TABLE 8C

| Schematic Parameters | | | |
|---|---|---|---|
| f [mm] | 13.46 | V3 | 20.4 |
| Fno | 1.65 | Sag4R1/CT4 | −0.77 |
| HFOV [deg.] | 9.7 | YT1o [mm] | 5.00 |
| DM2I/f | 0.51 | YT1i [mm] | 2.90 |
| $\lvert f/f2\rvert/(\lvert f/f3\rvert + \lvert f/f4\rvert + \lvert f/f5\rvert)$ | 1.40 | YM1o [mm] | 4.86 |
| $10 \times \lvert f2/f5\rvert$ | 1.74 | YM1i [mm] | 2.70 |
| (RM2 + R4)/(RM2 − R4) | 0.26 | YM2 [mm] | 2.35 |
| (R3 + R4)/(R3 − R4) | 0.54 | YT2 [mm] | 1.38 |
| (R4 + R9)/(R4 − R9) | −1.39 | $0.5 \times f/\sqrt{YT1o^2 - YT1i^2}$ | 1.65 |
| DM2M1i/DM2R4 | 0.70 | YT1o/DM2R2 | 1.90 |
| DM2R2/(CT2 + CT3 + CT4 + CT5) | 1.34 | (YT1i − YT2)/DM2R2 | 0.58 |
| T12/T34 | 0.65 | YT1i/ImgH | 1.23 |
| T45/T34 | 0.08 | YT1i/YT2 | 2.10 |
| N2 | 1.669 | YM2/YT2 | 1.70 |
| V2 + V4 | 39.0 | — | — |

9th Embodiment

Figure 17:
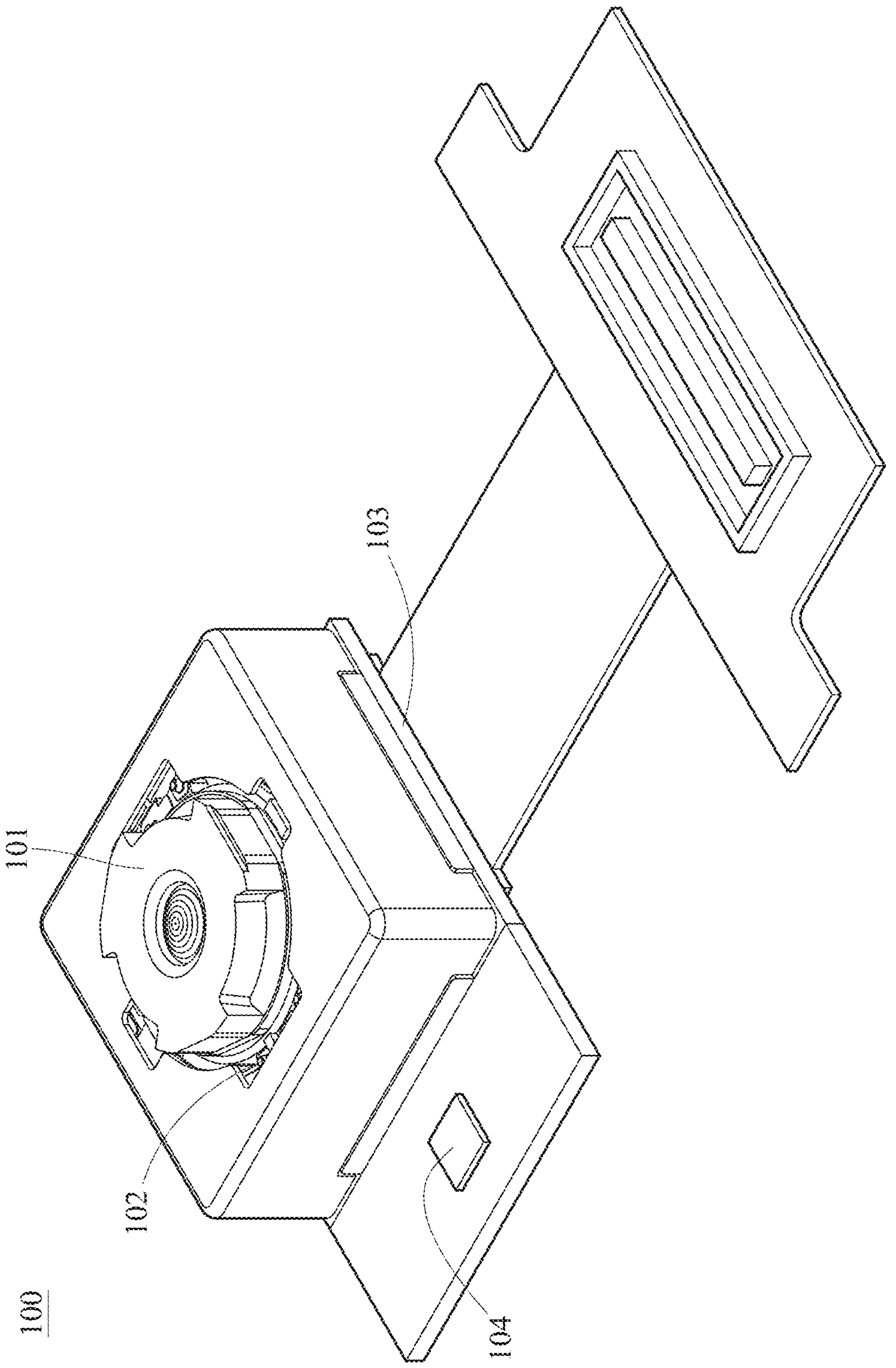
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 is a camera module including a lens unit 101, a driving device 102, an image sensor 103 and an image stabilizer 104. The lens unit 101 includes the photography optical lens assembly disclosed in the 1st embodiment, a barrel and a holder member (their reference numerals are omitted) for holding the photography optical lens assembly. However, the lens unit 101 may alternatively be provided with the photography optical lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the photography optical lens assembly to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

10th Embodiment

Figure 18:
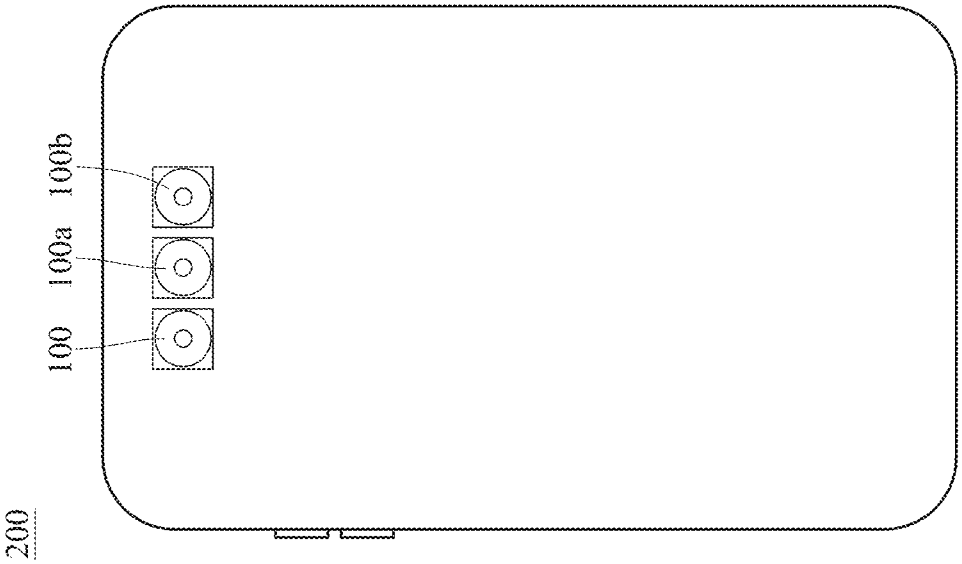
FIG. 18 is a perspective view of an electronic device according to the 10th embodiment of the present disclosure.
Figure 19:
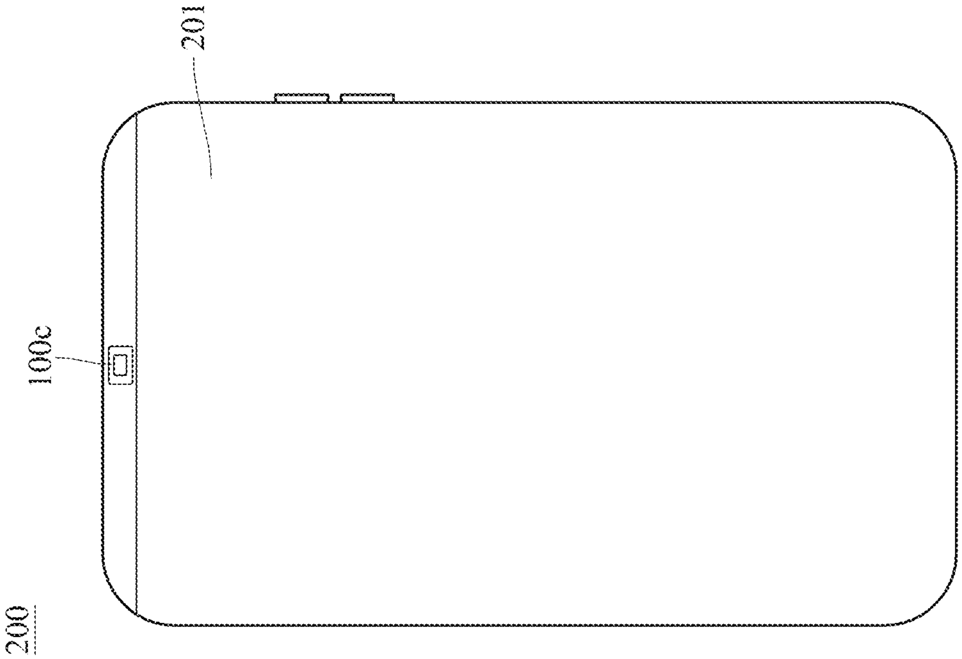
FIG. 19 is another perspective view of the electronic device in FIG. 18.

FIG. 18 is a perspective view of an electronic device according to the 10th embodiment of the present disclosure. FIG. 19 is another perspective view of the electronic device in FIG. 18.

In this embodiment, an electronic device 200 is a smartphone including the image capturing unit 100 disclosed in the 9th embodiment, an image capturing unit 100*a*, an image capturing unit 100*b*, an image capturing unit 100*c* and a display unit 201. As shown in FIG. 18, the image capturing unit 100, the image capturing unit 100*a* and the image capturing unit 100*b* are disposed on the same side of the electronic device 200 and face the same side, and each of the image capturing units 100, 100*a* and 100*b* has a single focal point. As shown in FIG. 19, the image capturing unit 100*c* and the display unit 201 are disposed on the opposite side of the electronic device 200, such that the image capturing unit 100*c* can be a front-facing camera of the electronic device 200 for taking selfies, but the present disclosure is not limited thereto. Furthermore, each of the image capturing units 100*a*, 100*b* and 100*c* can include the photography optical lens assembly of the present disclosure and can have a configuration similar to that of the image capturing unit 100. In detail, each of the image capturing units 100*a*, 100*b* and 100*c* can include a lens unit, a driving device, an image sensor and an image stabilizer, and each of the lens unit can include a photography optical lens assembly such as the photography optical lens assembly of the present disclosure, a barrel and a holder member for holding the photography optical lens assembly.

The image capturing unit 100 is a telephoto image capturing unit, the image capturing unit 100*a* is a wide-angle image capturing unit, the image capturing unit 100*b* is an ultra-wide-angle image capturing unit, and the image capturing unit 100*c* is a wide-angle image capturing unit. In this embodiment, the image capturing units 100, 100*a* and 100*b* have different fields of view, such that the electronic device 200 can have various magnification ratios so as to meet the requirement of optical zoom functionality. Moreover, as shown in FIG. 19, the image capturing unit 100*c* can have a non-circular opening, and the lens barrel or the lens elements in the image capturing unit 100*c* can have one or more trimmed edges at outer diameter positions thereof for corresponding to the non-circular opening. Therefore, it is favorable for further reducing the length of the image capturing unit 100*c* along single axis, thereby reducing the overall size of the lens, increasing the area ratio of the display unit 201 with respect to the electronic device 200, reducing the thickness of the electronic device 200, and achieving compactness of the overall module. In this embodiment, the electronic device 200 includes multiple image capturing units 100, 100*a*, 100*b* and 100*c*, but the present disclosure is not limited to the number and arrangement of image capturing units.

11th Embodiment

Figure 20:
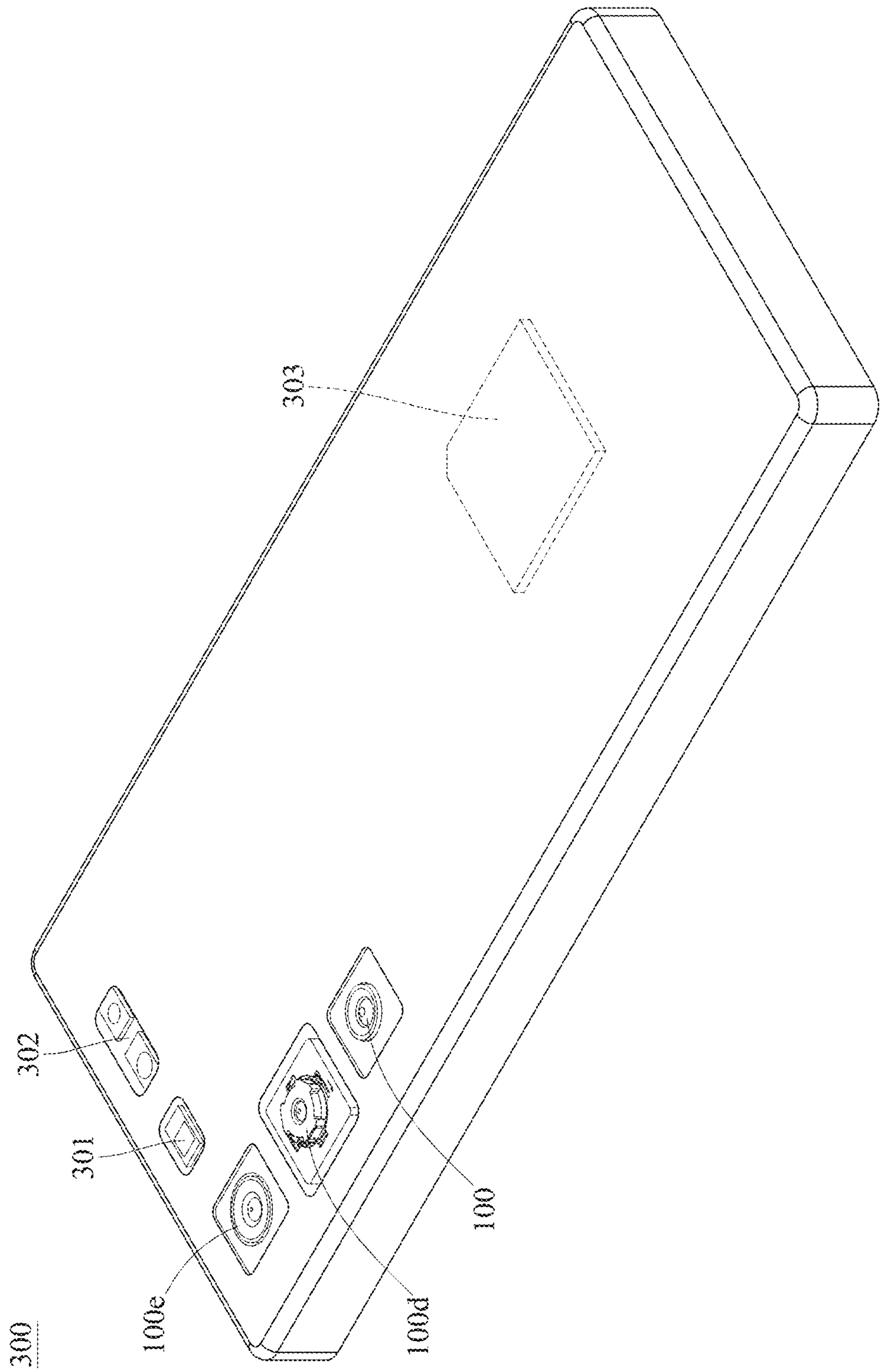
FIG. 20 is a perspective view of an electronic device according to the 11th embodiment of the present disclosure.
Figure 21:
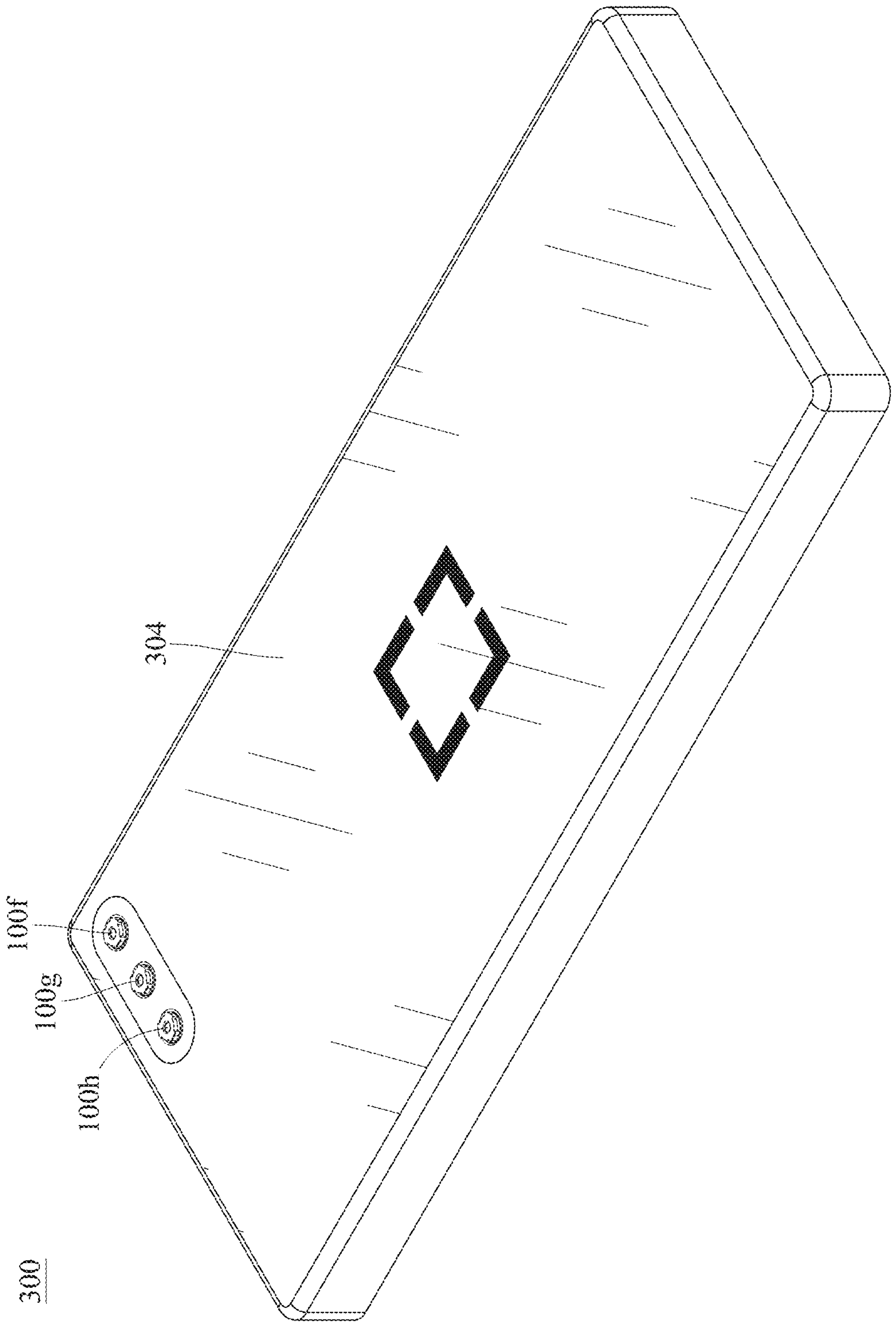
FIG. 21 is another perspective view of the electronic device in FIG. 20.
Figure 22:
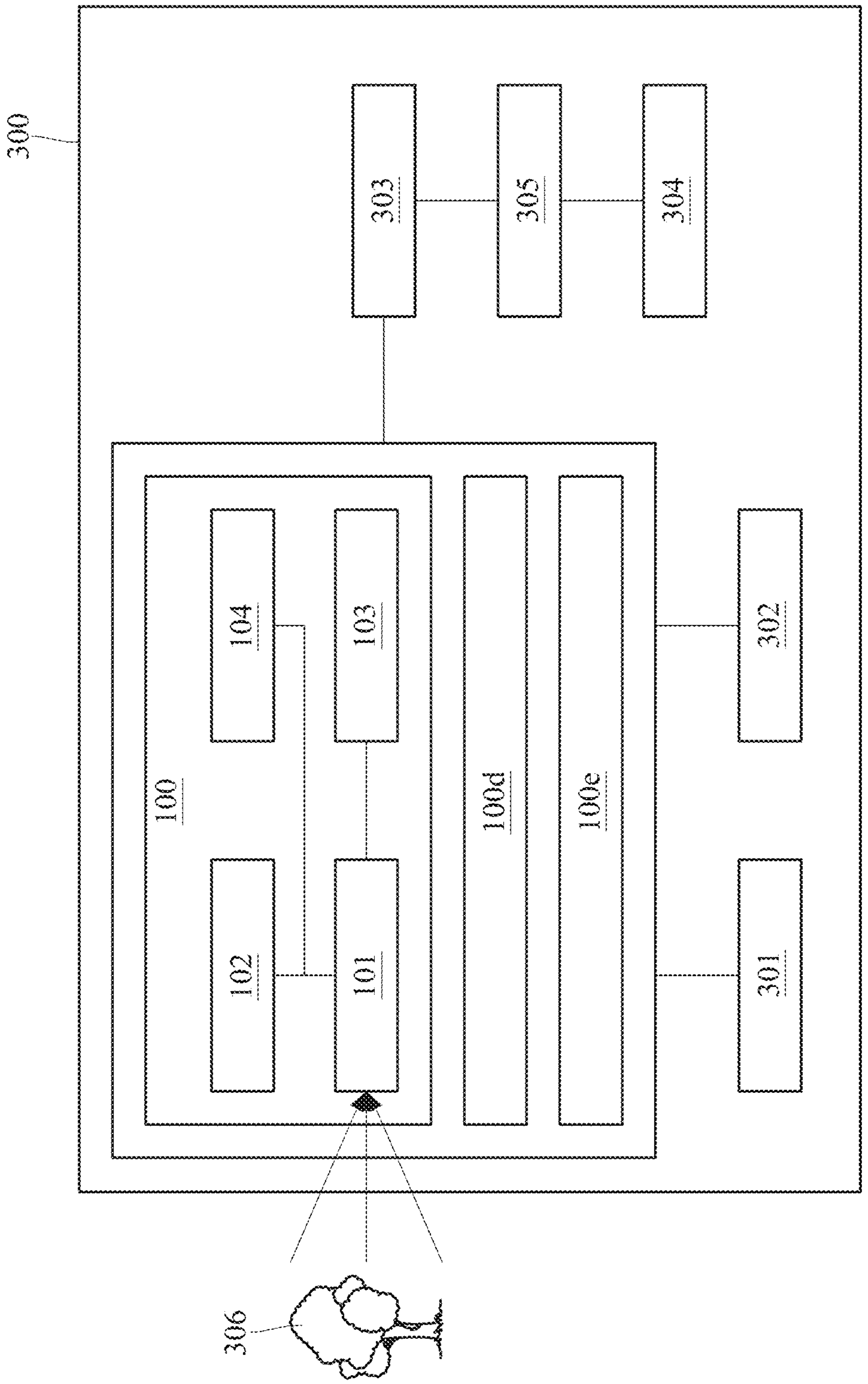
FIG. 22 is a block diagram of the electronic device in FIG. 20.

FIG. 20 is a perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 300 is a smartphone including the image capturing unit 100 disclosed in the 9th embodiment, an image capturing unit 100*d*, an image capturing unit 100*e*, an image capturing unit 100*f*, an image capturing unit 100*g*, an image capturing unit 100*h*, a flash module 301, a focus assist module 302, an image signal processor 303, a display module 304 and an image software processor 305. The image capturing unit 100, the image capturing unit 100*d* and the image capturing unit 100*e* are disposed on the same side of the electronic device 300. The focus assist module 302 can be a laser rangefinder or a ToF (time of flight) module, but the present disclosure is not limited thereto. The image capturing unit 100*f*, the image capturing unit 100*g*, the image capturing unit 100*h* and the display module 304 are disposed on the opposite side of the electronic device 300, and the display module 304 can be a user interface, such that the image capturing units 100*f*, 100*g*, 100*h* can be front-facing cameras of the electronic device 300 for taking selfies, but the present disclosure is not limited thereto. Furthermore, each of the image capturing units 100*d*, 100*e*, 100*f*, 100*g* and 100*h* can include the photography optical lens assembly of the present disclosure and can have a configuration similar to that of the image capturing unit 100. In detail, each of the image capturing units 100*d*, 100*e*, 100*f*, 100*g* and 100*h* can include a lens unit, a driving device, an image sensor and an image stabilizer, and each of the lens unit can include a photography optical lens assembly such as the photography optical lens assembly of the present disclosure, a barrel and a holder member for holding the photography optical lens assembly.

The image capturing unit 100 is a telephoto image capturing unit, the image capturing unit 100*d* is a wide-angle image capturing unit, the image capturing unit 100*e* is an ultra-wide-angle image capturing unit, the image capturing unit 100*f* is a wide-angle image capturing unit, the image capturing unit 100*g* is an ultra-wide-angle image capturing unit, and the image capturing unit 100*h* is a ToF image capturing unit. In this embodiment, the image capturing units 100, 100*d* and 100*e* have different fields of view, such that the electronic device 300 can have various magnification ratios so as to meet the requirement of optical zoom functionality. In addition, the image capturing unit 100*h* can determine depth information of the imaged object. In this embodiment, the electronic device 300 includes multiple image capturing units 100, 100*d*, 100*e*, 100*f*, 100*g* and 100*h*, but the present disclosure is not limited to the number and arrangement of image capturing units.

When a user captures images of an object 306, the light rays converge in the image capturing unit 100, the image capturing unit 100*d* or the image capturing unit 100*e* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*f*, 100*g* or 100*h* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

12th Embodiment

Figure 23:
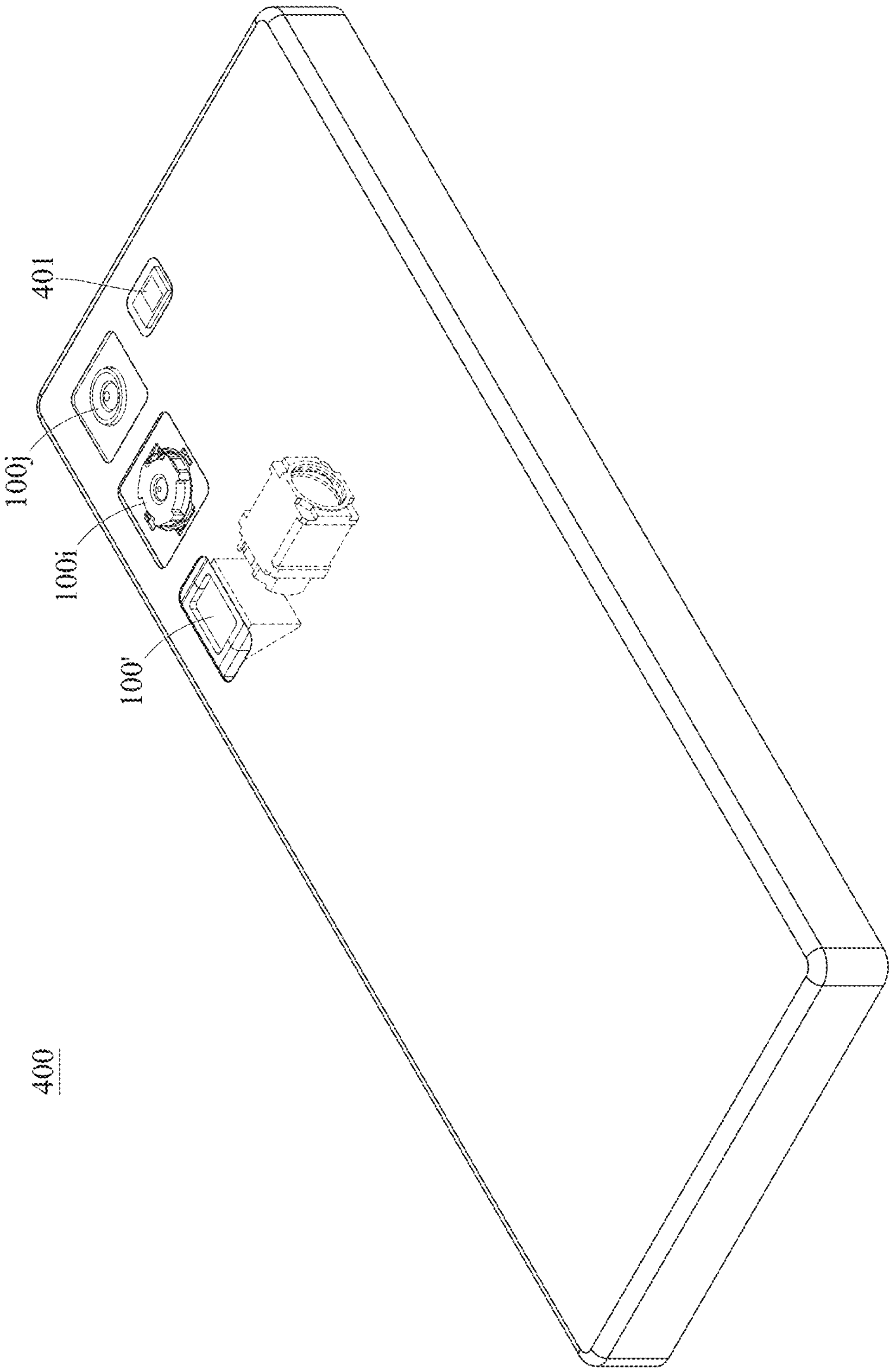
FIG. 23 is a perspective view of an electronic device according to the 12th embodiment of the present disclosure.

FIG. 23 is a perspective view of an electronic device according to the 12th embodiment of the present disclosure.

In this embodiment, an electronic device 400 is a smartphone including an image capturing unit 100', an image capturing unit 100*i*, an image capturing unit 100*j*, a flash module 401, a focus assist module, an image signal processor, a display module and an image software processor (not shown). The image capturing unit 100', the image capturing unit 100*i* and the image capturing unit 100*j* are disposed on the same side of the electronic device 400, while the display module is disposed on the opposite side of the electronic device 400. The image capturing unit 100' includes the image capturing unit 100 disclosed in the 9th embodiment. Furthermore, each of the image capturing units 100*i* and 100*j* can include the photography optical lens assembly of the present disclosure and can have a configuration similar to that of the image capturing unit 100, and the details in this regard will not be provided again.

The image capturing unit 100' is a telephoto image capturing unit, the image capturing unit 100*i* is a wide-angle image capturing unit, and the image capturing unit 100*j* is an ultra-wide-angle image capturing unit. In this embodiment, the image capturing units 100', 100*i* and 100*j* have different fields of view, such that the electronic device 400 can have various magnification ratios so as to meet the requirement of optical zoom functionality. In this embodiment, the electronic device 400 includes multiple image capturing units 100', 100*i* and 100*j*, but the present disclosure is not limited to the number and arrangement of image capturing units. When a user captures images of an object, light rays converge in the image capturing unit 100', 100*i* or 100*j* to generate images, and the flash module 401 is activated for light supplement. Further, the subsequent processes are performed in a manner similar to the abovementioned embodiment, so the details in this regard will not be provided again.

13th Embodiment

Figure 24:
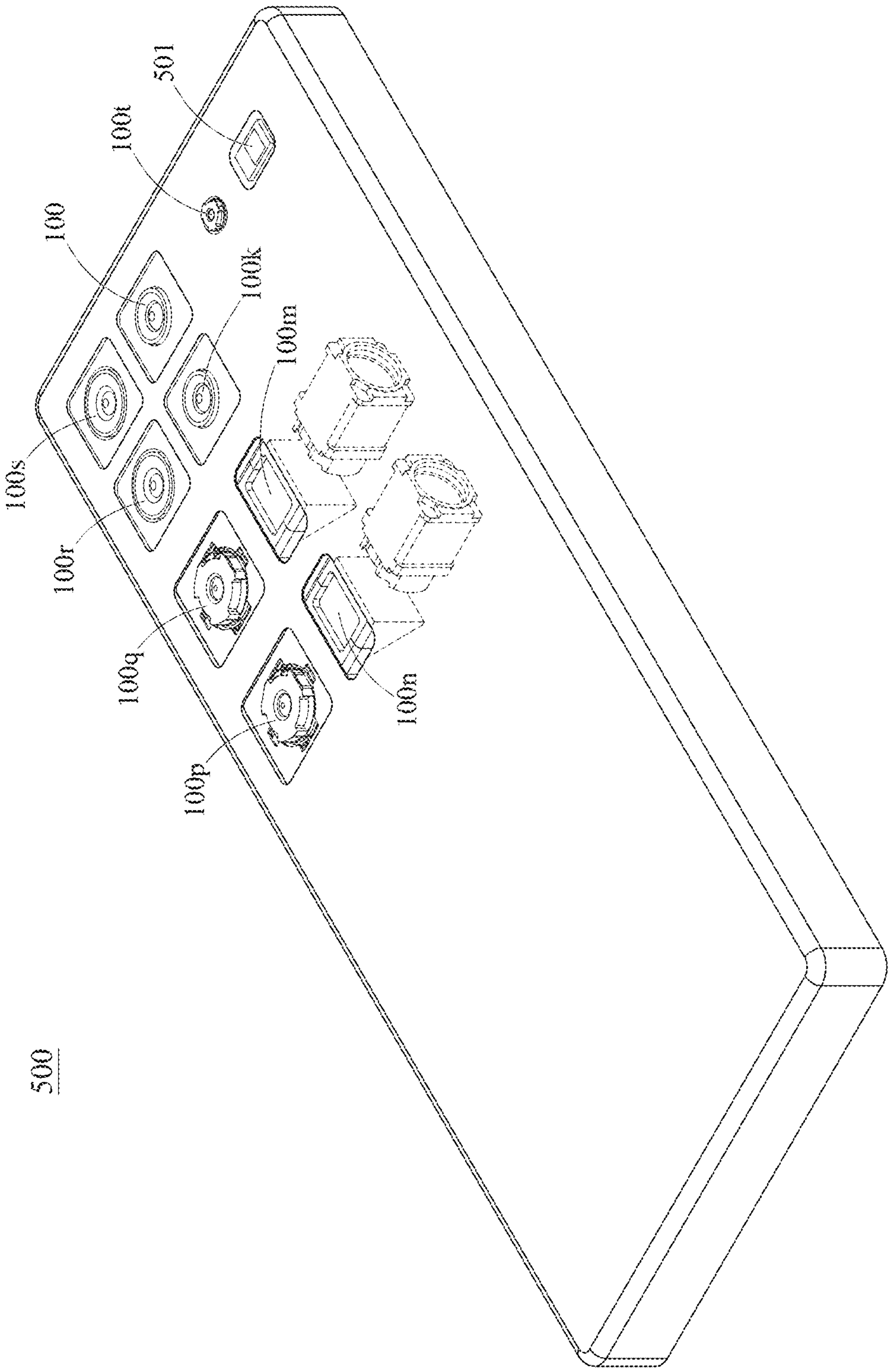
FIG. 24 is a perspective view of an electronic device according to the 13th embodiment of the present disclosure.

FIG. 24 is a perspective view of an electronic device according to the 13th embodiment of the present disclosure.

In this embodiment, an electronic device 500 is a smartphone including the image capturing unit 100 disclosed in the 9th embodiment, an image capturing unit 100*k*, an image capturing unit 100*m*, an image capturing unit 100*n*, an image capturing unit 100*p*, an image capturing unit 100*q*, an image capturing unit 100*r*, an image capturing unit 100*s*, an image capturing unit 100*t*, a flash module 501, a focus assist module, an image signal processor, a display module and an image software processor (not shown). The image capturing units 100, 100*k*, 100*m*, 100*n*, 100*p*, 100*q*, 100*r*, 100*s* and 100*t* are disposed on the same side of the electronic device 500, while the display module is disposed on the opposite side of the electronic device 500. Furthermore, each of the image capturing units 100*k*, 100*m*, 100*n*, 100*p*, 100*q*, 100*r*, 100*s* and 100*t* can include the photography optical lens assembly of the present disclosure and can have a configuration similar to that of the image capturing unit 100, and the details in this regard will not be provided again.

The image capturing unit 100 is a telephoto image capturing unit, the image capturing unit 100*k* is a telephoto image capturing unit, the image capturing unit 100*m* is a telephoto image capturing unit, the image capturing unit 100*n* is a telephoto image capturing unit, the image capturing unit 100*p* is a wide-angle image capturing unit, the image capturing unit 100*q* is a wide-angle image capturing unit, the image capturing unit 100*r* is an ultra-wide-angle image capturing unit, the image capturing unit 100*s* is an ultra-wide-angle image capturing unit, and the image capturing unit 100*t* is a ToF image capturing unit. In this embodiment, the image capturing units 100, 100*k*, 100*m*, 100*n*, 100*p*, 100*q*, 100*r* and 100*s* have different fields of view, such that the electronic device 500 can have various magnification ratios so as to meet the requirement of optical zoom functionality. In addition, the image capturing unit 100*t* can determine depth information of the imaged object. In this embodiment, the electronic device 500 includes multiple image capturing units 100, 100*k*, 100*m*, 100*n*, 100*p*, 100*q*, 100*r*, 100*s* and 100*t*, but the present disclosure is not limited to the number and arrangement of image capturing units. When a user captures images of an object, the light rays converge in the image capturing unit 100, 100*k*, 100*m*, 100*n*, 100*p*, 100*q*, 100*r*, 100*s* or 100*t* to generate images, and the flash module 501 is activated for light supplement. Further, the subsequent processes are performed in a manner similar to the abovementioned embodiments, and the details in this regard will not be provided again.

The smartphone in several embodiments is only exemplary for showing the image capturing unit of the present disclosure installed in an electronic device, and the present disclosure is not limited thereto. The image capturing unit can be optionally applied to optical systems with a movable focus. Furthermore, the photography optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photography optical lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein each of the object-side surface and the image-side surface of the first lens element has a central area and a peripheral area, the peripheral area of the object-side surface of the first lens element has a first refractive surface, the peripheral area of the image-side surface of the first lens element has a first reflective surface, the central area of the object-side surface of the first lens element has a second reflective surface, and the central area of the image-side surface of the first lens element has a second refractive surface;

wherein a distance in parallel with a central axis between an axial vertex on the second reflective surface and a minimum effective radius position on the first reflective surface is DM2M1i, an axial distance between the second reflective surface and the image-side surface of the second lens element is DM2R4, an axial distance between the second reflective surface and an image surface is DM2I, a focal length of the photography optical lens assembly is f, an axial distance between the third lens element and the fourth lens element is T34, an axial distance between the fourth lens element and the fifth lens element is T45, a minimum effective radius of the first refractive surface is YT1i, a maximum effective radius of the second refractive surface is YT2, and the following conditions are satisfied:

$$0.30 < DM2M1i/DM2R4 < 1.00;$$

$$0.35 < DM2I/f < 0.80;$$

$$0.05 < T45/T34 < 2.50; \text{ and}$$

$$1.20 < YT1i/YT2 < 3.50.$$

2. The photography optical lens assembly of claim 1, wherein the distance in parallel with the central axis between the axial vertex on the second reflective surface and the minimum effective radius position on the first reflective surface is DM2M1i, the axial distance between the second reflective surface and the image-side surface of the second lens element is DM2R4, and the following condition is satisfied:

$$0.50 < DM2M1i/DM2R4 < 0.95.$$

3. The photography optical lens assembly of claim 1, wherein the axial distance between the second reflective surface and the image surface is DM2I, the focal length of the photography optical lens assembly is f, and the following condition is satisfied:

$$0.40 < DM2I/f < 0.60.$$

4. The photography optical lens assembly of claim 1, wherein the second lens element has negative refractive power, and at least one of the object-side surface and the image-side surface of at least one lens element among the second lens element to the fifth lens element has at least one inflection point.

5. The photography optical lens assembly of claim 1, wherein a curvature radius of the image-side surface of the second lens element is R4, a curvature radius of the object-side surface of the fifth lens element is R9, and the following condition is satisfied:

$$-10.00 < (R4+R9)/(R4-R9) < 0.$$

6. The photography optical lens assembly of claim 1, wherein an axial distance between the second reflective surface and the second refractive surface is DM2R2, a central thickness of the second lens element is CT2, a central thickness of the third lens element is CT3, a central thickness of the fourth lens element is CT4, a central thickness of the fifth lens element is CT5, and the following condition is satisfied:

$$1.00 < DM2R2/(CT2+CT3+CT4+CT5) < 2.50.$$

7. The photography optical lens assembly of claim 1, wherein a focal length of the second lens element is f2, a focal length of the fifth lens element is f5, and the following condition is satisfied:

$$0 < 10\times|f2/f5| < 9.00.$$

8. The photography optical lens assembly of claim 1, wherein an axial distance between the first lens element and the second lens element is T12, the axial distance between the third lens element and the fourth lens element is T34, and the following condition is satisfied:

$$0 < T12/T34 < 1.20.$$

9. The photography optical lens assembly of claim 1, wherein the second refractive surface is convex in a paraxial region thereof.

10. The photography optical lens assembly of claim 1, wherein a maximum effective radius of the first refractive surface is YT1o, an axial distance between the second reflective surface and the second refractive surface is DM2R2, and the following condition is satisfied:

$$1.50 < YT1o/DM2R2 < 3.00.$$

11. The photography optical lens assembly of claim 1, wherein the minimum effective radius of the first refractive surface is YT1i, a maximum image height of the photography optical lens assembly is ImgH, and the following condition is satisfied:

$$0.90 < YT1i/ImgH < 2.00.$$

12. The photography optical lens assembly of claim 1, wherein the minimum effective radius of the first refractive surface is YT1i, the maximum effective radius of the second refractive surface is YT2, and the following condition is satisfied:

$$1.50 < YT1i/YT2 < 3.00.$$

13. The photography optical lens assembly of claim 1, wherein an Abbe number of the second lens element is V2, an Abbe number of the fourth lens element is V4, and the following condition is satisfied:

$$20.0 < V2+V4 < 70.0.$$

14. The photography optical lens assembly of claim 1, wherein along a travelling sequence of the optical path, incident light enters the first lens element via the first refractive surface, is then reflected off the first reflective surface, is subsequently reflected off the second reflective surface, and finally exits the first lens element via the second refractive surface.

15. The photography optical lens assembly of claim 1, wherein the object-side surface of the first lens element further has a light-blocking area located between the central area and the peripheral area thereof, and the image-side surface of the first lens element further has a light-blocking area located between the central area and the peripheral area thereof.

16. An image capturing unit, comprising:

the photography optical lens assembly of claim 1; and an image sensor disposed on the image surface of the photography optical lens assembly.

17. An electronic device, comprising:

the image capturing unit of claim 16.

18. A photography optical lens assembly comprising five lens elements, the five lens elements being, in order from an object side to an image side along an optical path, a first lens element, a second lens element, a third lens element, a fourth lens element and a fifth lens element, and each of the five lens elements having an object-side surface facing toward the object side and an image-side surface facing toward the image side;

wherein each of the object-side surface and the image-side surface of the first lens element has a central area and a peripheral area, the peripheral area of the object-side surface of the first lens element has a first refractive surface, the peripheral area of the image-side surface of the first lens element has a first reflective surface, the central area of the object-side surface of the first lens element has a second reflective surface, and the central area of the image-side surface of the first lens element has a second refractive surface;

wherein the second lens element has negative refractive power, and the image-side surface of the second lens element is concave in a paraxial region thereof, wherein a curvature radius of the object-side surface of the second lens element is R3, a curvature radius of the image-side surface of the second lens element is R4, a refractive index of the second lens element is N2, a maximum effective radius of the second reflective surface is YM2, a maximum effective radius of the second refractive surface is YT2, and the following conditions are satisfied:

$$0.10 < (R3 + R4)/(R3 - R4) < 5.00;$$

$$1.560 < N2 < 1.720; \text{ and}$$

$$1.20 < YM2/YT2 < 250.$$

19. The photography optical lens assembly of claim 18, wherein each of the second lens element to the fifth lens element is a plastic lens element;

wherein the curvature radius of the object-side surface of the second lens element is R3, the curvature radius of the image-side surface of the second lens element is R4, and the following condition is satisfied:

$$0.20 < (R3 + R4)/(R3 - R4) < 3.00.$$

20. The photography optical lens assembly of claim 18, wherein a curvature radius of the second reflective surface at a central axis is RM2, the curvature radius of the image-side surface of the second lens element is R4, and the following condition is satisfied:

$$-0.10 < (RM2 + R4)/(RM2 - R4) < 1.00.$$

21. The photography optical lens assembly of claim 18, wherein a focal length of the photography optical lens assembly is f, a focal length of the second lens element is f2, a focal length of the third lens element is f3, a focal length of the fourth lens element is f4, a focal length of the fifth lens element is f5, and the following condition is satisfied:

$$0.60 < |f/f2|/(|f/f3| + |f/f4| + |f/f5|) < 10.00.$$

22. The photography optical lens assembly of claim 18, wherein an axial distance between the third lens element and the fourth lens element is T34, an axial distance between the fourth lens element and the fifth lens element is T45, and the following condition is satisfied:

$$0.05 < T45/T34 < 2.50.$$

23. The photography optical lens assembly of claim 18, wherein a focal length of the photography optical lens assembly is f, a maximum effective radius of the first refractive surface is YT1o, a minimum effective radius of the first refractive surface is YT1i, and the following condition is satisfied:

$$1.00 < 0.5 \times f\sqrt{YT1o^2 - YT1i^2} < 2.00.$$

24. The photography optical lens assembly of claim 18, wherein a displacement in parallel with a central axis from an axial vertex on the object-side surface of the fourth lens element to a maximum effective radius position on the object-side surface of the fourth lens element is Sag4R1, a central thickness of the fourth lens element is CT4, and the following condition is satisfied:

$$-2.00 < Sag4R1/CT4 < -0.20.$$

25. The photography optical lens assembly of claim 18, wherein a minimum effective radius of the first refractive surface is YT1i, the maximum effective radius of the second refractive surface is YT2, an axial distance between the second reflective surface and the second refractive surface is DM2R2, and the following condition is satisfied:

$$0.20 < (YT1i - YT2)/DM2R2 < 1.00.$$

26. The photography optical lens assembly of claim 18, wherein the maximum effective radius of the second reflective surface is YM2, the maximum effective radius of the second refractive surface is YT2, and the following condition is satisfied:

$$1.45 < YM2/YT2 < 2.20.$$

27. The photography optical lens assembly of claim 18, wherein an Abbe number of the third lens element is V3, and the following condition is satisfied:

$$10.0 < V3 < 21.0.$$

28. The photography optical lens assembly of claim 18, wherein the second lens element is located closer to the image side than the first reflective surface.

29. The photography optical lens assembly of claim 18, wherein a distance in parallel with a central axis between an axial vertex on the second reflective surface and a minimum effective radius position on the first reflective surface is DM2M1i, an axial distance between the second reflective surface and the image-side surface of the second lens element is DM2R4, an axial distance between the second reflective surface and an image surface is DM2I, a focal length of the photography optical lens assembly is f, an axial distance between the third lens element and the fourth lens element is T34, an axial distance between the fourth lens element and the fifth lens element is T45, the curvature radius of the object-side surface of the second lens element is R3, the curvature radius of the image-side surface of the second lens element is R4, the refractive index of the second lens element is N2, and the following conditions are satisfied:

$$0.70 \leq DM2M1i/DM2R4 \leq 0.89;$$

$$0.47 \leq DM2I/f \leq 0.51;$$

$$0.08 \leq T45/T34 \leq 0.70;$$

$$0.37 \leq (R3+R4)/(R3-R4) \leq 1.08; \text{ and}$$

$$1.614 \leq N2 \leq 1.686.$$

* * * * *